US009862116B2

(12) United States Patent
Barnett et al.

(10) Patent No.: US 9,862,116 B2
(45) Date of Patent: Jan. 9, 2018

(54) DUAL SPEED GEARBOXES, TRANSMISSIONS, AND APPARATUSES INCORPORATING THE SAME

(71) Applicant: BLACK & DECKER INC., Newark, DE (US)

(72) Inventors: Corey Barnett, Bowie, MD (US); Ashok Samuel Baskar, Lutherville, MD (US)

(73) Assignee: BLACK & DECKER INC., New Britain, CT (US)

( * ) Notice: Subject to any disclaimer, the term of this patent is extended or adjusted under 35 U.S.C. 154(b) by 422 days.

(21) Appl. No.: 14/548,434

(22) Filed: Nov. 20, 2014

(65) Prior Publication Data

US 2016/0144529 A1 May 26, 2016

(51) Int. Cl.
*B27B 17/08* (2006.01)
*F16H 3/24* (2006.01)
*F16H 3/00* (2006.01)
*B25F 5/00* (2006.01)
*F16H 63/30* (2006.01)
*F16H 3/30* (2006.01)

(52) U.S. Cl.
CPC ............. *B27B 17/08* (2013.01); *B25F 5/001* (2013.01); *F16H 3/30* (2013.01); *F16H 63/30* (2013.01)

(58) Field of Classification Search
CPC . B25F 5/001; B27B 17/08; F16H 3/30; F16H 63/30
See application file for complete search history.

(56) References Cited

U.S. PATENT DOCUMENTS

| 851,842 | A | | 4/1907 | Sears |
| 1,572,067 | A | | 2/1926 | Booker |
| 1,912,011 | A | | 5/1933 | Riess et al. |
| 2,650,626 | A | | 9/1953 | Kiekhaefer |
| 2,883,000 | A | | 4/1959 | Mattson |
| 2,883,872 | A | | 4/1959 | Gommel |
| 2,911,841 | A | | 11/1959 | Miller |
| 3,142,196 | A | * | 7/1964 | Haskell .................. B27B 17/08 74/414 |
| 3,178,956 | A | | 4/1965 | Stanley |
| 3,331,331 | A | | 7/1967 | Irgens et al. |
| 3,332,411 | A | | 7/1967 | Bloom et al. |

(Continued)

FOREIGN PATENT DOCUMENTS

| EP | 2444205 A2 | 4/2012 |
| EP | 3 088 148 A1 * | 11/2016 |
| FR | 1299309 A | 7/1962 |

OTHER PUBLICATIONS

David Chariot, European Search Report, dated Oct. 6, 2016, The Hague, for EP 15 19 5723.

(Continued)

*Primary Examiner* — Hwei C Payer
(74) *Attorney, Agent, or Firm* — John Yun

(57) ABSTRACT

Dual speed gearboxes, transmissions, and apparatuses incorporating the same are provided herein. Example embodiments include a first gear and a second gear that are coupled to an output spindle, a first bracket and a second bracket for moving the gears along the output spindle, an armature shaft with two different sized pinions, and an actuator that moves the brackets to bring the gears into contact with the pinions.

18 Claims, 27 Drawing Sheets

(56) References Cited

U.S. PATENT DOCUMENTS

| | | |
|---|---|---|
| 3,619,545 A | 11/1971 | Borden |
| 3,717,221 A | 2/1973 | Densow |
| 3,776,369 A | 12/1973 | Schrack et al. |
| 3,809,185 A | 5/1974 | Kobayashi et al. |
| 3,835,715 A | 9/1974 | Howell |
| 3,837,433 A | 9/1974 | Combs, Jr. et al. |
| 3,844,380 A | 10/1974 | Batson |
| 3,938,622 A | 2/1976 | Densow |
| 4,036,326 A | 7/1977 | Mukai et al. |
| 4,068,378 A * | 1/1978 | Arai ............... B27B 17/086 30/382 |
| 4,094,382 A | 6/1978 | Lee |
| 4,353,163 A | 10/1982 | Overbury et al. |
| 4,418,766 A | 12/1983 | Grossman |
| 4,534,005 A | 8/1985 | Nagashima et al. |
| 4,678,411 A | 7/1987 | Wieland |
| 4,683,659 A | 8/1987 | Wunsch et al. |
| 4,710,071 A | 12/1987 | Koehler et al. |
| 4,726,260 A | 2/1988 | Lovrenich et al. |
| 4,764,093 A | 8/1988 | Nagashima |
| 4,797,073 A | 1/1989 | Kubota |
| 4,801,253 A | 1/1989 | Johansson |
| 4,813,139 A | 3/1989 | Nagashima |
| 4,968,230 A | 11/1990 | Progl |
| 5,032,067 A | 7/1991 | Progl |
| 5,184,403 A | 2/1993 | Schliemann |
| 5,236,314 A | 8/1993 | Nagashima |
| 5,411,382 A | 5/1995 | Duensing |
| 5,787,854 A | 8/1998 | Uhlig et al. |
| 6,789,631 B1 | 9/2004 | Realme, Sr. et al. |
| 6,860,341 B2 | 3/2005 | Spielmann et al. |
| 7,033,149 B2 | 4/2006 | Lugger et al. |
| 7,134,508 B2 * | 11/2006 | Prell ............... B23D 51/16 173/122 |
| 7,525,287 B2 | 4/2009 | Miyashita et al. |
| 7,717,192 B2 | 5/2010 | Schroeder et al. |
| 7,762,349 B2 * | 7/2010 | Trautner ............ B23B 45/008 173/104 |
| 7,886,841 B2 | 2/2011 | Armstrong |
| 7,926,187 B2 | 4/2011 | Uehlein-Proctor et al. |
| 7,987,920 B2 | 8/2011 | Schroeder et al. |
| 8,109,343 B2 | 2/2012 | Schroeder et al. |
| 8,172,004 B2 | 5/2012 | Ho |
| 2004/0022654 A1 | 2/2004 | Ishida |
| 2005/0025636 A1 | 2/2005 | Durr |
| 2005/0028377 A1 * | 2/2005 | Stones ............. A01G 3/08 30/134 |
| 2010/0043234 A1 | 2/2010 | Pellenc |
| 2011/0232436 A1 | 9/2011 | Morabit |
| 2012/0099936 A1 * | 4/2012 | Bean ............... B25F 5/001 408/124 |
| 2013/0000132 A1 | 1/2013 | Bergquist et al. |
| 2013/0020102 A1 | 1/2013 | Bjornlinger et al. |
| 2016/0144529 A1 * | 5/2016 | Barnett ............ B27B 17/08 30/381 |

OTHER PUBLICATIONS

Annex to the European Search Report on European Patent Application No. EP 15 19 5723, dated Oct. 6, 2016.

* cited by examiner

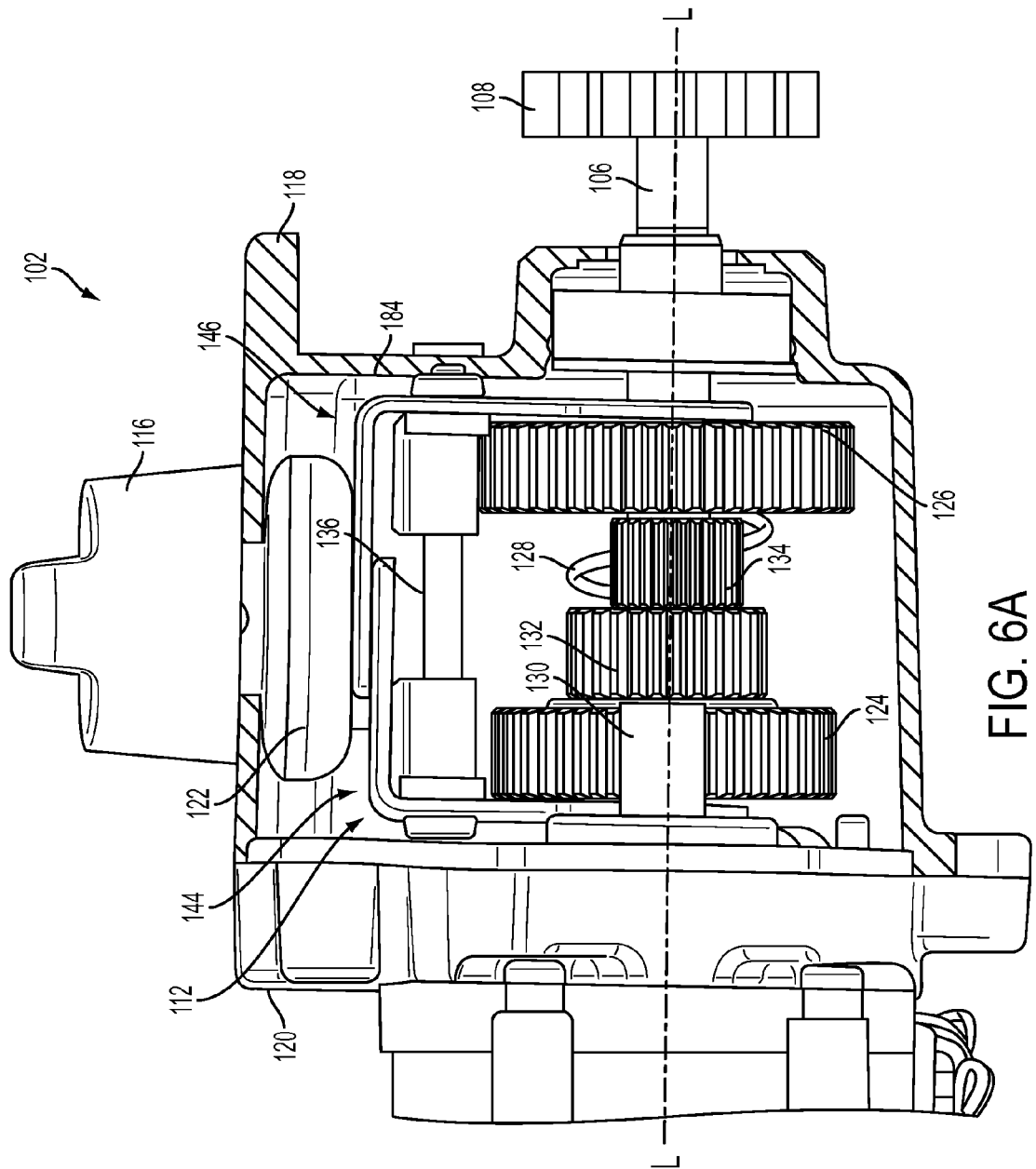

DUAL SPEED GEARBOXES, TRANSMISSIONS, AND APPARATUSES INCORPORATING THE SAME

BACKGROUND

Power tools such as chainsaws and hedge trimmers can operate at a constant speed and torque. For example, a chainsaw drives a cutting chain at a constant speed (measured in revolutions per minute) around a blade. The cutting chain is communicated around the blade by a sprocket that is attached to an output spindle. The output spindle is rotated by a motor, which causes the sprocket to rotate. The motor can include an electric motor or an internal combustion engine. Rotation of the output spindle and sprocket cause the cutting chain to operate at a constant speed and cause teeth of the cutting chain to impart torque to cut into a work piece.

Some cutting operations benefit from higher speed and lower torque settings for a power tool. For example, if a user desires to cut a soft wood work piece and the work piece is thick, a higher speed and lower torque is useful because the lower torque may reduce tearing of the work piece, while the higher speed will allow the user to cut through the thick work piece more quickly.

Some cutting operations and power tools benefit from operating at a lower speed. For example, some power tools incorporate a battery that is used to power an electric motor. When operating at a constant speed and torque the power tool will exhaust the battery within a given period of time. The ability to reduce the speed of the power tool in certain contexts will increase operating time of the tool by reducing battery usage.

SUMMARY

Generally, the present technology includes dual speed assemblies such as gearboxes, transmissions, and apparatuses that incorporate such dual speed assemblies. The dual speed assemblies allow an output spindle of a transmission to be rotated at different rates of rotation, providing for high and low speeds as well as high and low torque settings. These dual speed assemblies include an actuator that moves a pair of brackets. The movement of the brackets relative to one another translates a pair of gears linearly along the output spindle. The translation of the pair of gears causes the each of the pair of gears to align with and engage at least one of two armature pinions that are coupled to an armature shaft that is rotated by a motor. The armature pinions include a large armature pinion and a small armature pinion. When one of the pair of gears engages with the large armature pinion the output spindle is rotated at a first rate of rotation and low torque. When one of the pair of gears engages with the small armature pinion the output spindle is rotated at a second rate of rotation and a higher torque. The first rate of rotation is greater than the second rate of rotation, providing dual speed settings.

According to some embodiments, the present technology may be directed to an assembly comprising: (a) a first gear; (b) a second gear, the first gear and the second gear held in spaced apart relationship by a gear spacer that is disposed therebetween, the first gear and the second gear being coupled to an output spindle; (c) a first bracket; (d) a second bracket, the first gear and the second gear being disposed between the first and second brackets, the first and second brackets being capable of moving along the output spindle; (e) an armature shaft having a first armature pinion and a second armature pinion; and (f) an actuator coupled with the first and second brackets, the actuator having a first position and a second position. When the actuator is in the first position the first and second brackets are moved along the output spindle such that the first armature pinion engages with the first gear. When the actuator is in the second position the first and second brackets are moved along the output spindle such that the second armature pinion engages with the second gear.

In one embodiment, the assembly includes a pair of guide rails coupled to the first gear and the first and second brackets, the first and second brackets being capable of moving along the pair of guide rails.

In another embodiment, the actuator has a third position. When the actuator is in the third position the first and second brackets are moved along the output spindle such that neither the first armature pinion nor the second armature pinion engages with either the first gear or the second gear, placing the assembly in a neutral position.

In some embodiments, the first bracket comprises a first bracket top plate that comprises a high speed cam aperture and the second bracket comprises a second bracket top plate that comprises a low speed cam aperture.

In one embodiment, the first bracket top plate is disposed under the second bracket top plate such that the high speed cam aperture is transverse to the low speed cam aperture.

In another embodiment, the high speed cam aperture and the low speed cam aperture move relative to one another by movement of the actuator.

In additional embodiments, placing the actuator in the first position causes the second bracket to locate to a second bracket stop while the first bracket is moved towards the second bracket.

In one embodiment, placing the actuator in the second position causes the first bracket to locate at a first bracket stop while the second bracket is moved towards the first bracket.

In some embodiments, placing the actuator in the third position causes the first bracket to locate to the first bracket stop and the second bracket to locate to the second bracket stop.

In one embodiment, the high speed cam aperture has a semi-circular cam sidewall with an apex edge and one linear edge and the low speed cam aperture has a moon-shaped cam sidewall with a concave edge and a convex edge.

In another embodiment, when the actuator is in the first position the actuator moves the first and second brackets such that the actuator contacts the one linear edge of the high speed cam aperture without contacting the concave edge of the low speed cam aperture.

In some embodiments, when the actuator is in the second position the actuator moves the first and second brackets such that the actuator contacts the apex edge of the high speed cam aperture without contacting the convex edge of the low speed cam aperture.

In one embodiment, when the actuator is in the third position the actuator moves the first and second brackets such that the actuator contacts neither the high speed cam aperture or the low speed cam aperture.

In another embodiment, when the actuator is in the first position, the output spindle is operated at a first rate of rotation by the first armature pinion and the first gear.

In yet another embodiment, when the actuator is in the second position, the output spindle is operated at a second rate of rotation by the second armature pinion and the second gear.

In one embodiment, the second rate of rotation that is less than the first rate of rotation.

According to some embodiments, the present technology may be directed to a chain saw having a multi-speed transmission comprising: (a) a motor having an armature shaft; (b) a transmission having an output spindle, the transmission having a gear box connecting the armature shaft to the output spindle; and (c) the output spindle driving a cutting element.

In one embodiment, the gearbox includes a first gear and second gear, and a first pinion and second pinion, wherein the first gear and first pinion are engaged in a high speed position, and the second gear and the second pinion are engaged in a low speed position.

In another embodiment, the gearbox further includes a first bracket and a second bracket, the first bracket adapted to move the first gear into engagement with the first spindle, and the second bracket is adapted to move the second gear into engagement with the second spindle. The first and second gears are rotatingly fixed to the output spindle but free to move along a longitudinal axis of the output spindle. The first pinion and second pinion are fixedly secured to the armature shaft, and an actuator is adapted to move the first bracket and second bracket so that in a high speed position the first gear engages the first pinion, and in a low speed position the second gear engages the second pinion.

In one embodiment, the chain saw includes a gear spacer located in between the first and second gear to bias the gears apart. The first bracket has a first plate with an aperture and the second bracket has a second plate with an aperture and at least a portion of the two apertures overlap. The actuator includes a pin which extends through the apertures of both brackets, and operation of the actuator moves the pin against the sidewall of at least one of the apertures to move one of the first or second brackets.

In another embodiment, the actuator includes a third neutral position, where neither the first gear or the second gear is engaged with either the first or second pinion.

In yet another embodiment, the chain saw further includes an oil pump connected to the output spindle so that more oil is pumped the chain saw is in the high speed position, and less oil is pumped when in the low speed position.

According to some embodiments, the present technology may be directed to an apparatus comprising: (a) two gears that are coupled to an output spindle, each of the two gears being capable of rotating the output spindle; (b) two brackets for translating the two gears along the output spindle; (c) a first armature pinion and a second armature pinion, both the first armature pinion and the first armature pinion coupled to an armature shaft; and (d) an actuator capable of being located in a first position and a second position, when the actuator is in the first position the actuator moves one of the two brackets causing the first armature pinion to engage with at least one of the two gears and the second pinion rotates freely and when the actuator is in the second position the actuator moves one of the two brackets causing the second armature pinion to engage with at least one of the two gears and the first pinion rotates freely.

In one embodiment, the apparatus further includes a sprocket coupled with the output spindle, the sprocket transferring rotational movement of the output spindle to a cutting member coupled to the sprocket.

In another embodiment, the apparatus further includes a gear collar disposed between the two gears, the gear collar defining maintaining a space between the two gears when the actuator is in either the first position and the second position so as to align the first and second armature pinions with at least one of the two gears.

In another embodiment, the apparatus further includes an oil pump coupled to the output spindle, the oil pump delivering oil to the output spindle and a cutting member associated with the output spindle at the same time, wherein oil is delivered by the oil pump according to the rotation of the output spindle.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 6A is a partial cross-sectional view of the transmission of FIGS. 2 and 4-5 illustrating the transmission being in a neutral position.

DETAILED DESCRIPTION

Figure 1:
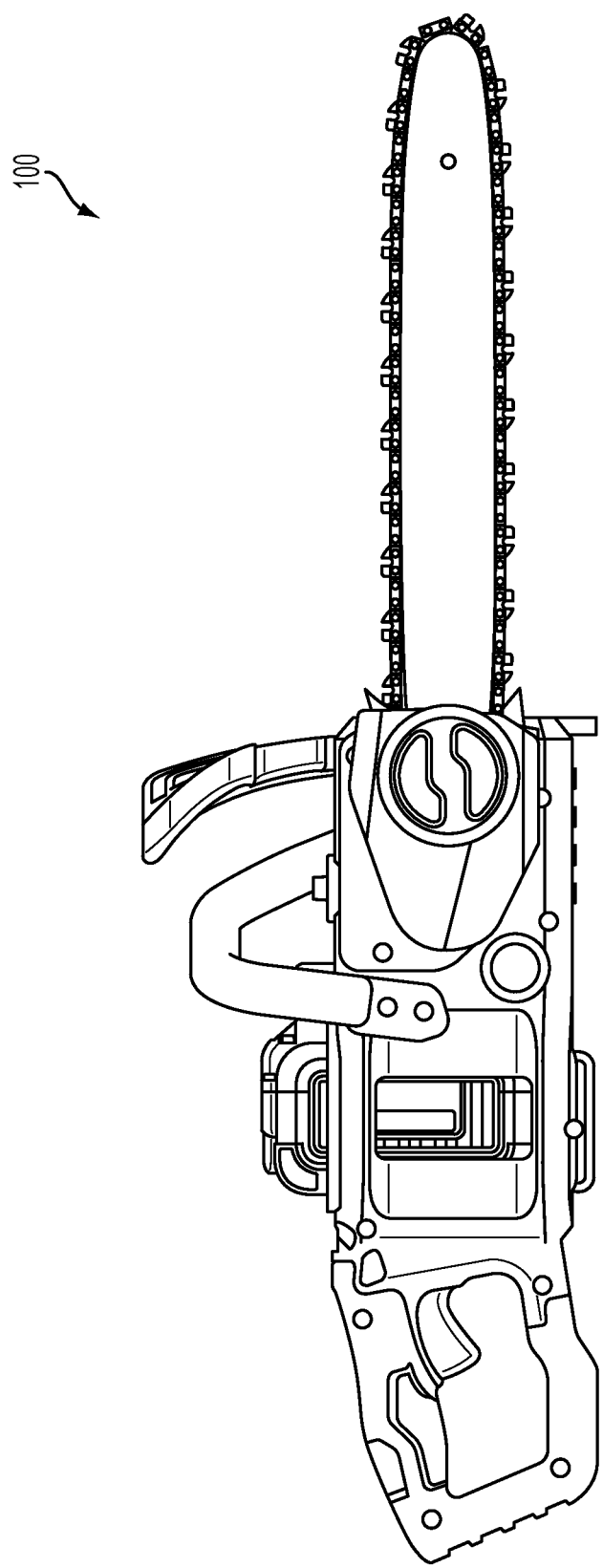
FIG. 1 is a side view of an apparatus that incorporates an example of a dual speed transmission/gearbox in accordance with at least one embodiment.

In some embodiments, the present technology is directed to an assembly (e.g., a gearbox or transmission) for use in a power tool such as a chainsaw or hedge trimmer. The assembly allows the power tool to operate in both a high speed mode and a low speed mode. For example, the assembly can be integrated into a transmission and drive assembly of a chainsaw. The chainsaw can be used in both a high speed mode and a low speed mode by operation of the assembly. The high speed mode is when the chainsaw rotates a cutting chain at a first rate of speed. The low speed mode is when the chainsaw rotates the cutting chain at a second rate of speed that is less than the first rate of speed.

For example, if a user needs to operate the chainsaw at a higher speed to cut a work piece relatively fast, the user can place the assembly in high speed mode, which causes the chainsaw to operate (e.g., driving a cutting chain) at high speed. In another example, if the user desires to operate the chainsaw at a lower speed to preserve battery life, the user can place the assembly in low speed mode, which causes the chainsaw to operate (e.g., driving a cutting chain) at low speed.

The assembly includes an actuator (e.g., a knob or shifter assembly) for changing the power tool from the high speed mode to the low speed mode, and vice-versa. Also, the assembly can be placed in a neutral position using the actuator, where the chainsaw does not rotate the cutting chain at all.

In one embodiment, the assembly includes a set of gears such as a first gear and a second gear that are held apart from one another using a gear spacer (e.g., a compression spring). The pair of gears and the gear spacer are coupled to an output spindle. For example, each of the pair of gears is placed onto the output spindle. The gear spacer is located in between the pair of gears. The output spindle rotates the cutting chain of the chainsaw.

The pair of gears are coupled to the output spindle in such a way that the pair of gears can move forward and backward along the output spindle. The pair of gears can move independently from one another. Each of the pair of gears is also capable of rotating the output spindle.

In one embodiment, the gears are moved along the output spindle by a pair of brackets. A first bracket of the pair of brackets is positioned outside the first gear and a second bracket of the pair of brackets is positioned outside the second gear. The pair of brackets also moves forward and backward along the output spindle.

In one embodiment, each of the brackets includes a cam aperture (e.g., a patterned hole). The brackets are installed onto the output shaft such that their cam apertures overlap one another. The unique shape of the cam apertures allows a pin of the actuator to selectively engage with the pair of brackets to move the pair of brackets along the output spindle. In some embodiments, the shape of the cam apertures allows one bracket to be moved while the other stays stationary. That is, the brackets can be moved independently from one another. For example, one bracket can be moved backward along the output spindle while the other bracket remains stationary. In other embodiments, the brackets can be moved simultaneously. For example, the pair of brackets can be moved forward or backward along the output spindle at the same time.

The actuator (e.g., a knob or shifter) moves the brackets forward and backward along the output spindle. The actuator includes a pin that engages with the cam apertures of the output spindle to move the brackets. The actuator can be placed in a first position which causes the brackets to move into a high speed position. The movement of the brackets causes the gears to move into a high speed position. The actuator can be placed in a second position which causes the brackets to move into a low speed position. The movement of the brackets causes the gears to move into a low speed position. The actuator can be placed in a third position which causes the brackets and gears to move into a neutral position.

In one embodiment, the assembly includes an armature shaft that is coupled to a motor (e.g., electric motor) of the chainsaw. When the motor is engaged it causes the armature shaft to spin at a given rate that is governed by the speed of the motor.

In another embodiment, the armature shaft includes two armature pinions (e.g., gears). While the armature pinions rotate due to rotation of the armature shaft by the motor, the armature pinions do not move along the length of the output spindle.

Movement of the brackets as described above cause the pair of gears to selectively move into contact with one or more of the armature pinions to cause the output spindle to move at different rates of speed. For example, when the first gear is brought into contact with one of the armature pinions, the output spindle is rotated at a high speed, causing the chainsaw to operate in high speed mode. When the second gear is brought into contact with the other armature pinion the output spindle is rotated at a low speed, causing the chainsaw to operate in low speed mode.

Thus, the assembly allows selective operation of the chainsaw (or other similar power tool) in a high speed mode, a low speed mode, and/or a neutral mode.

Referring to FIG. 1, apparatus 100 incorporates a dual speed transmission/gearbox of the present technology. The apparatus 100 shown is a chainsaw, although it will be understood that the dual speed transmission/gearbox of the present technology can be incorporated into any apparatus that causes rotation of an output spindle to accomplish work. Other non-limiting examples of apparatuses that may use the dual speed transmission/gearbox include a hedge trimmer, a drill, a screwdriver, a sander, or other or any other suitable apparatus.

Figure 2A:
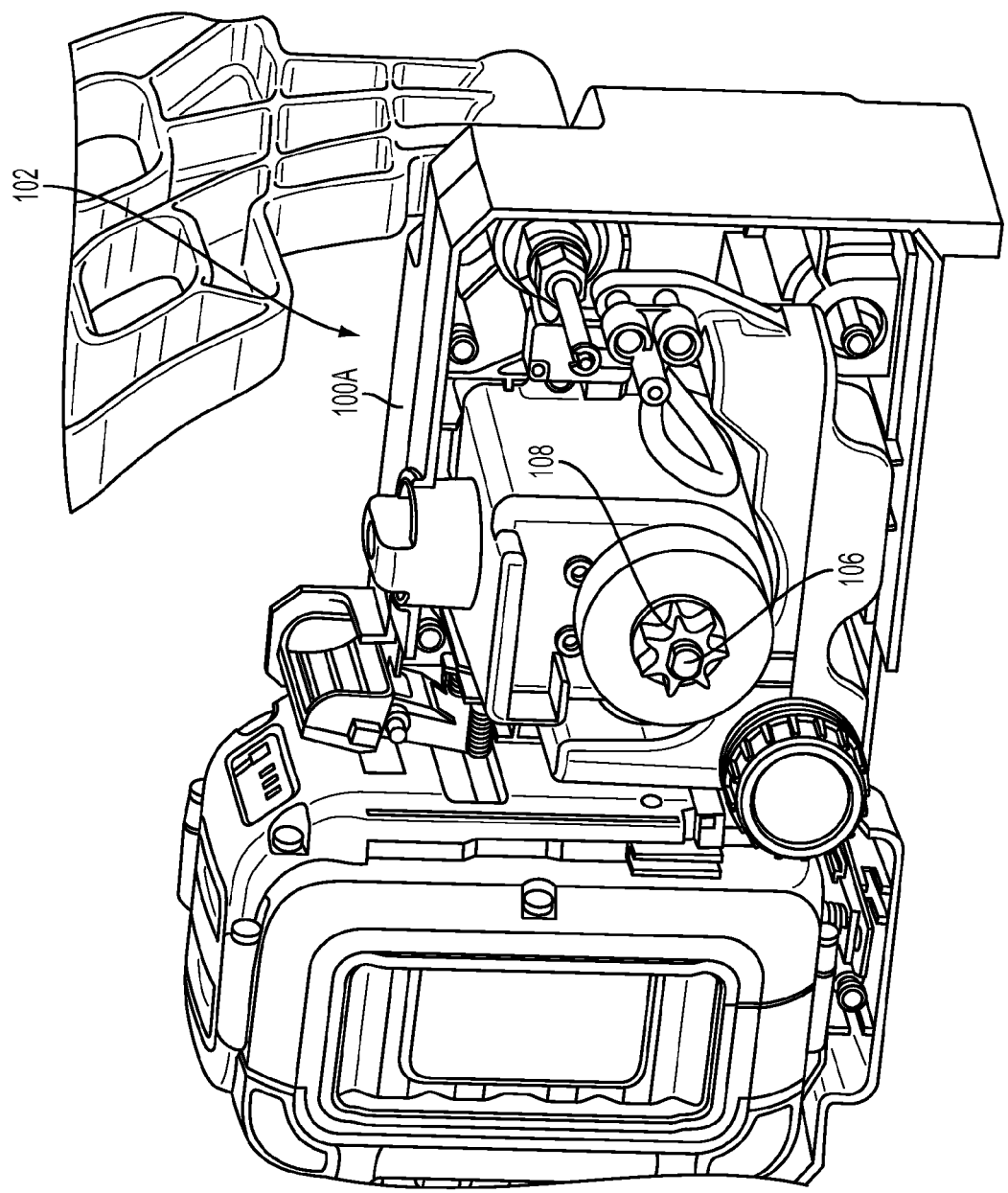
FIG. 2A is a perspective, partial cutaway view of the apparatus of FIG. 1 illustrating an example transmission according to some embodiments.
Figure 2B:
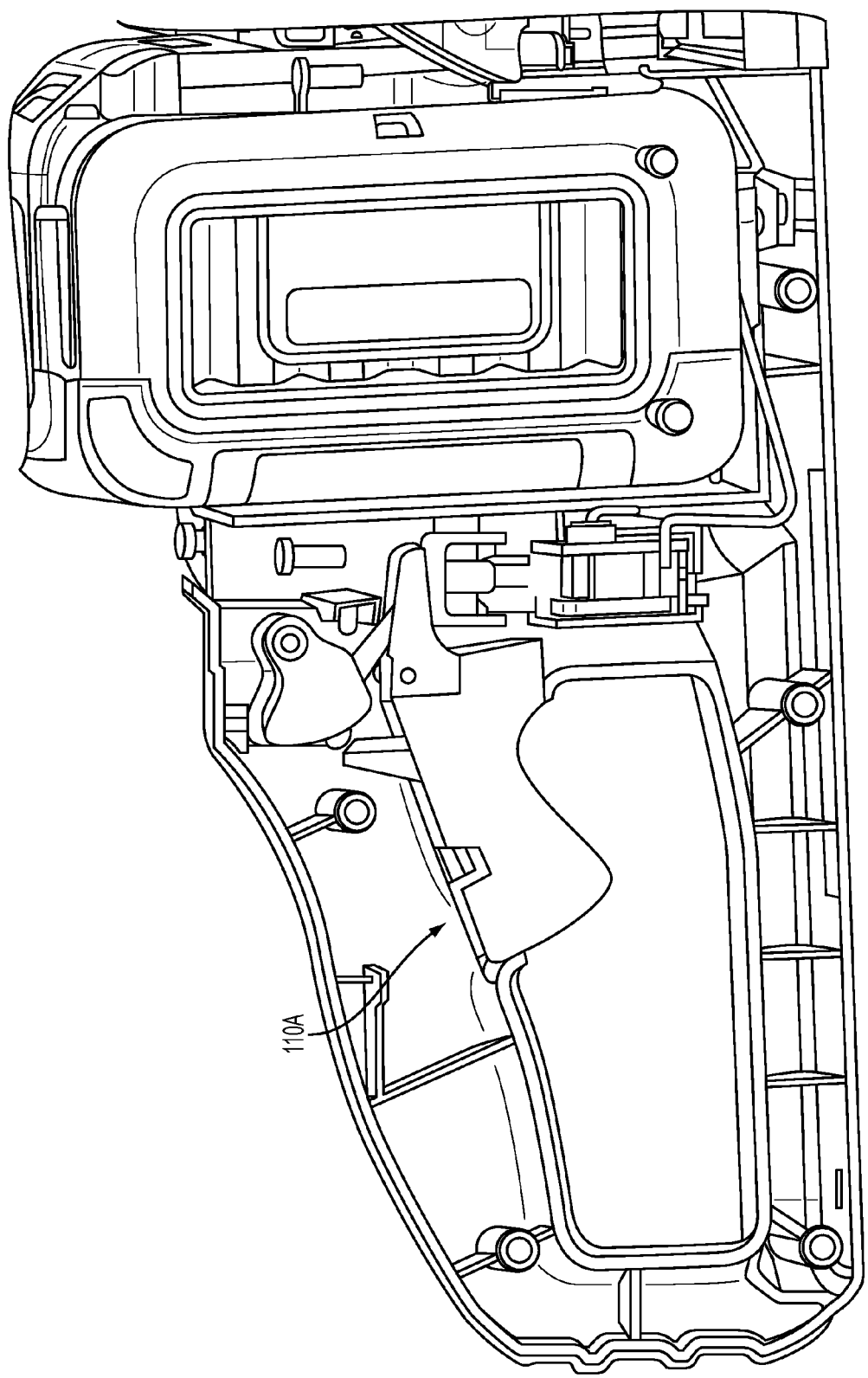
FIG. 2B is a partial cutaway view of the apparatus of FIG. 1 illustrating an example trigger according to some embodiments.
Figure 3:
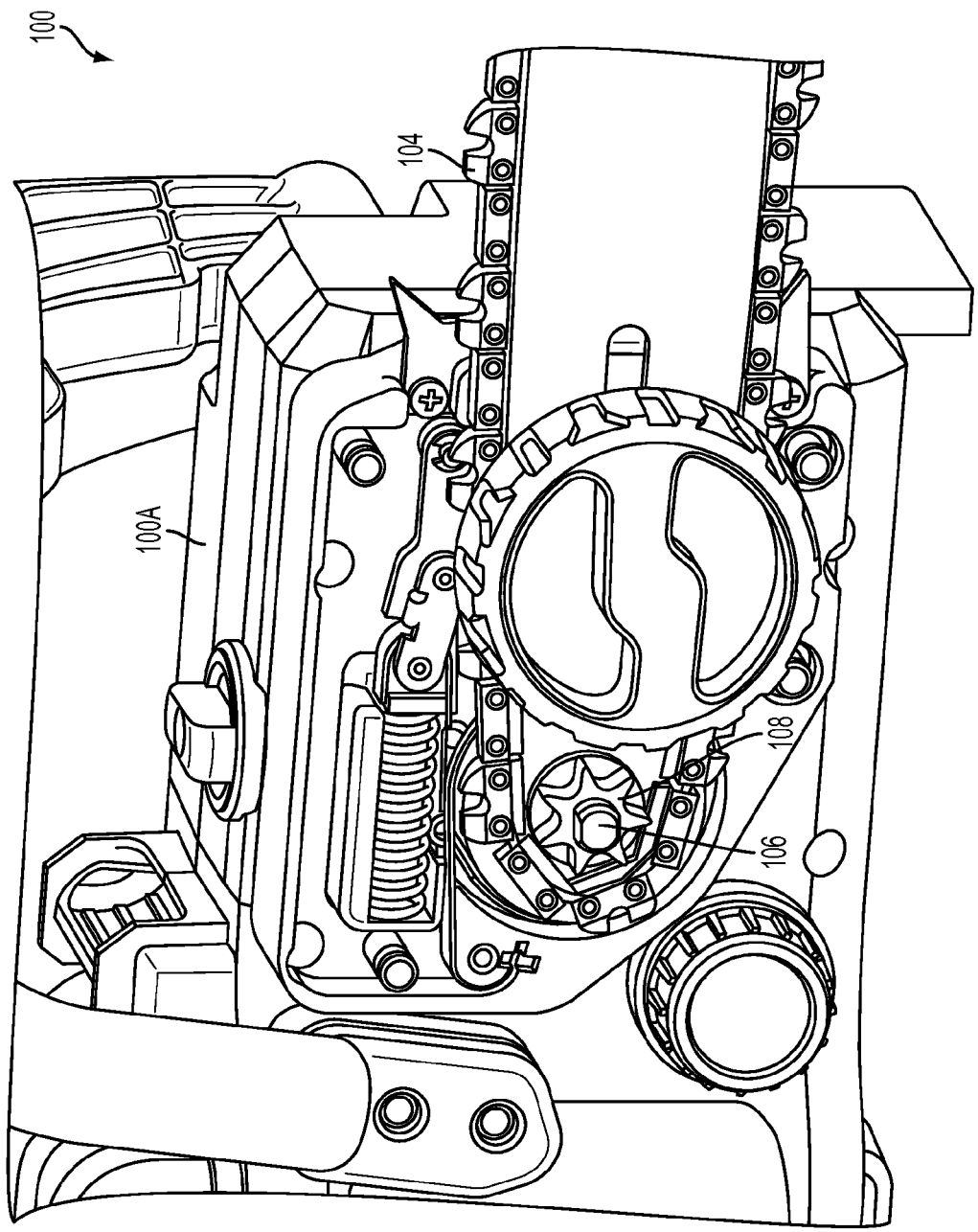
FIG. 3 is a perspective, partial cutaway view of the apparatus of FIG. 1 illustrating an example cutting member that is coupled to an output spindle of the transmission of FIG. 2 in accordance with at least one embodiment.

Referring to FIGS. 2A, 2B and 3, an example embodiment of a transmission 102 is enclosed within an apparatus housing 100A. In some embodiments, the transmission may be 102 rotatingly coupled with a cutting member 104 (e.g., cutting chain) by an output spindle 106 of the transmission 102. In one embodiment, the output spindle 106 is coupled with the cutting member 104 by a drive sprocket 108. In one embodiment the drive sprocket 108 is fixedly connected to a terminal end of the output spindle 106.

Figure 4:
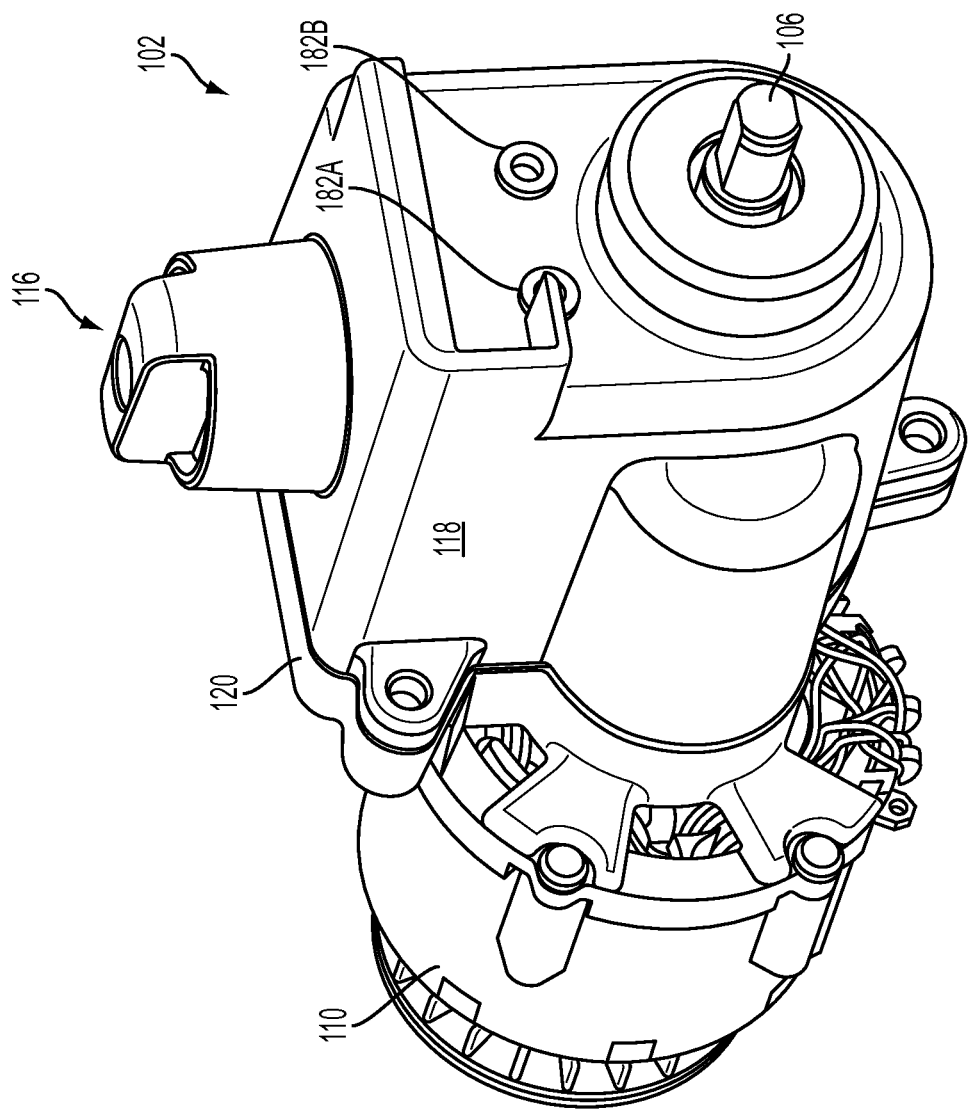
FIG. 4 is a perspective view of the transmission of FIG. 2A.
Figure 5:
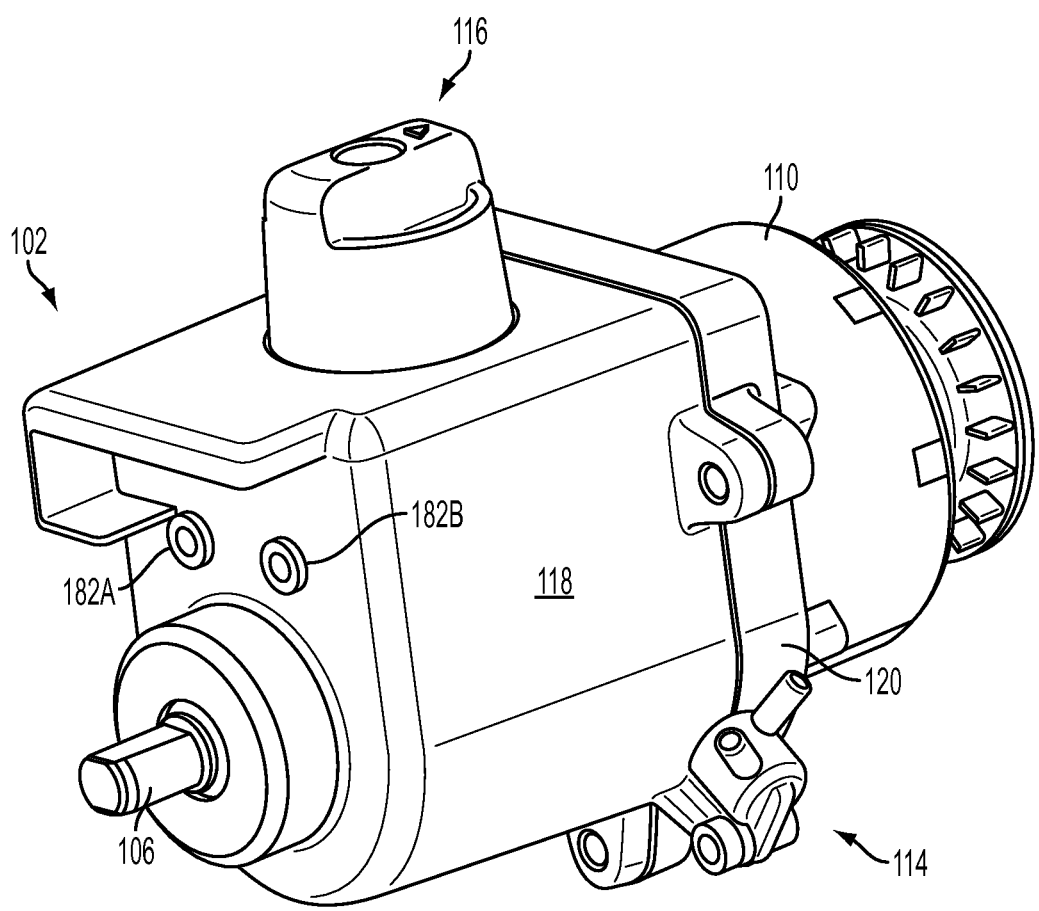
FIG. 5 is a perspective view of the transmission of FIG. 2A illustrating a portion of an oil pump assembly of the transmission.

Referring to FIGS. 4 and 5, in an embodiment, a portion of the transmission 102 is shown in combination with a motor 110. The motor 110 may include an electric motor or an internal combustion engine that is capable of providing rotational input to the transmission 102. The motor 110 is engaged by a trigger 110A (see FIG. 2B).

Referring to FIGS. 4, 5 and 6A, in one embodiment, the transmission 102 includes the output spindle 106, a gearbox assembly 112 (illustrated in FIG. 6A), an oil pump assembly 114, and an actuator 116. The transmission 102 is configured to receive rotational input from the motor 110 and transfer the rotational input on the output spindle 106 in a selective manner. In one embodiment, the transmission 102 causes the output spindle 106 to rotate at a first rate of rotation. In another embodiment, the transmission 102 causes the output spindle 106 to rotate at a second rate of rotation. In some embodiments, the transmission 102 can be selectively changed from the first rate of rotation to the second rate of rotation using the actuator 116. In some embodiments, the transmission 102 can be selectively changed to a third rate of rotation, which is zero (a neutral mode). It will be understood that a "rate of rotation" may also be referred to herein as a "speed". In an example embodiment, the first rate of rotation is greater than the second rate of rotation.

For clarity, the phrase "first rate of rotation" is synonymous with first position of the actuator and high speed mode of the gearbox assembly. The phrase "second rate of rotation" is synonymous with second position of the actuator or low speed mode of the gearbox assembly. The phrase "third position" is synonymous with neutral mode of the gearbox assembly. Regardless of the component being discussed, the first position relates to high speed mode, the second position related to low speed mode, and the third position relates to neutral mode.

In one embodiment, the gearbox assembly 112 generally includes a gearbox housing 118 that includes a gearbox cover 120. The gearbox cover 120 is fixedly or releaseably coupled with the motor 110. The gearbox housing 118 can be releaseably attached to the gearbox cover 120 in some instances to allow for the gearbox housing 118 to be removed if access to components located within the gearbox housing 118 is necessary. The actuator 116 of the transmission 102 extends from an aperture in the top of the gearbox housing 118. The oil pump assembly 114 is disposed at least partially outside of the gearbox housing 118 in one embodiment.

Figure 6B:
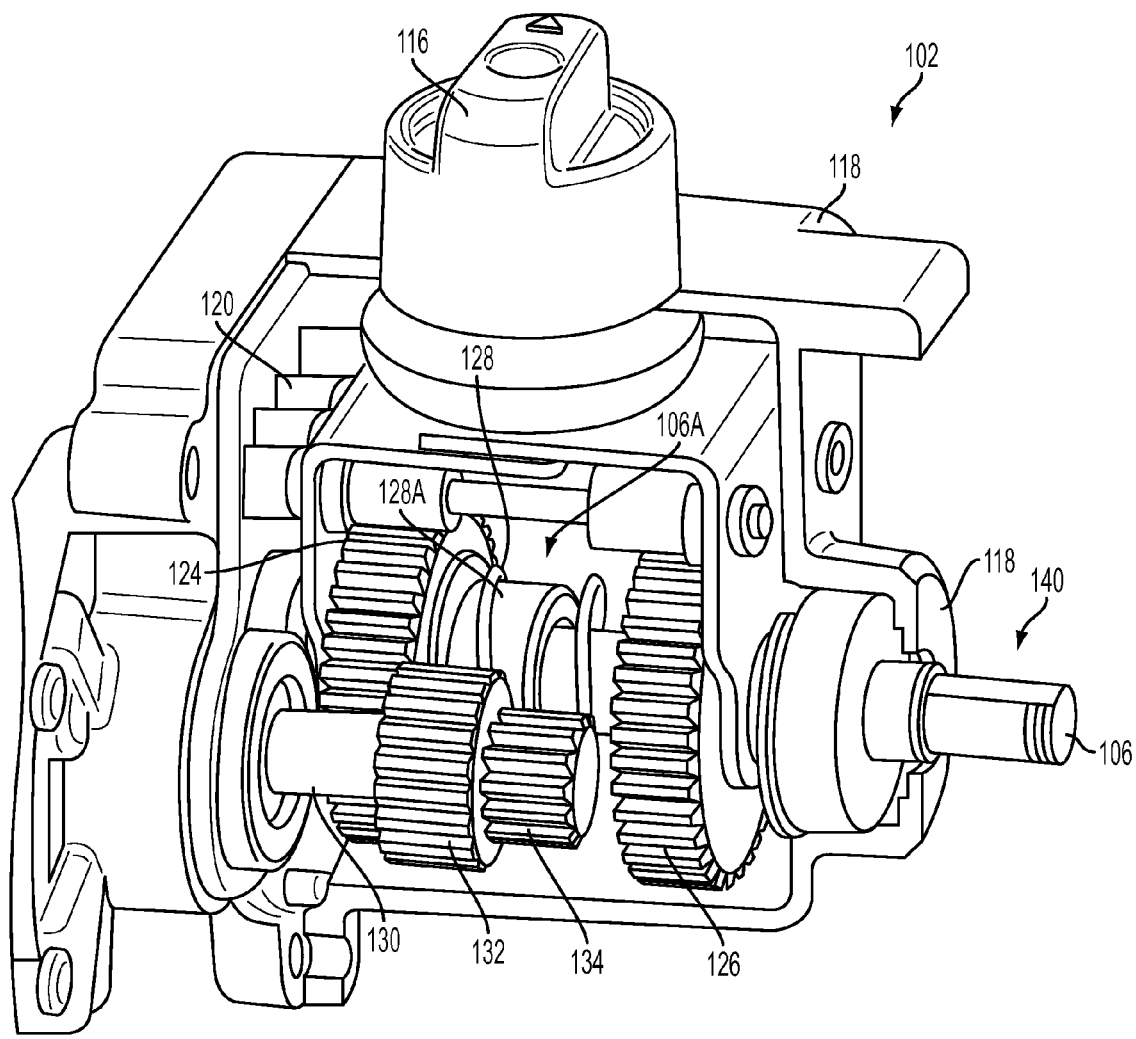
FIG. 6B is a partial perspective, cross-sectional view transmission of FIGS. 2 and 4-5, illustrating the transmission being in a neutral position.

FIG. 6A illustrates an example embodiment of the transmission 102 in a neutral position (third position). The gearbox housing 118 encloses a bracket assembly 122, a first gear 124, a second gear 126, a gear spacer 128, an armature shaft 130 (FIG. 6B), a first armature pinion 132, a second armature pinion 134, and guide rail 136. A portion of the actuator 116 and the output spindle 106 are positioned within the gearbox housing 118. For example, a terminal end 140 of the output spindle 106 extends from the gearbox housing 118 such that the drive sprocket 108 can be fixedly (or releasably) attached to the terminal end 140 of the output spindle 106.

The armature shaft 130 transfers rotational input generated by the motor 110 (see FIGS. 4 and 5).

The armature shaft 130 is located within the gearbox housing 118 and comprises the first armature pinion 132 and the second armature pinion 134. The first and second armature pinions 132 and 134 are fixedly attached to the armature shaft 130 and are both rotated when the armature shaft 130 is rotated by the motor 110. The first and second armature pinions 132 and 134 do not translate along the direction of the output spindle 106.

In an example embodiment, the first armature pinion 132 engages with the first gear 124 when the first gear 124 is moved into alignment with the first armature pinion 132. The second armature pinion 134 engages with the second gear 126 when the second gear 126 is moved into alignment with the second armature pinion 134. Movement of the gears is caused by movement of the brackets 144 and 146 (discussed later) when the actuator 116 position is changed.

Figure 6C:
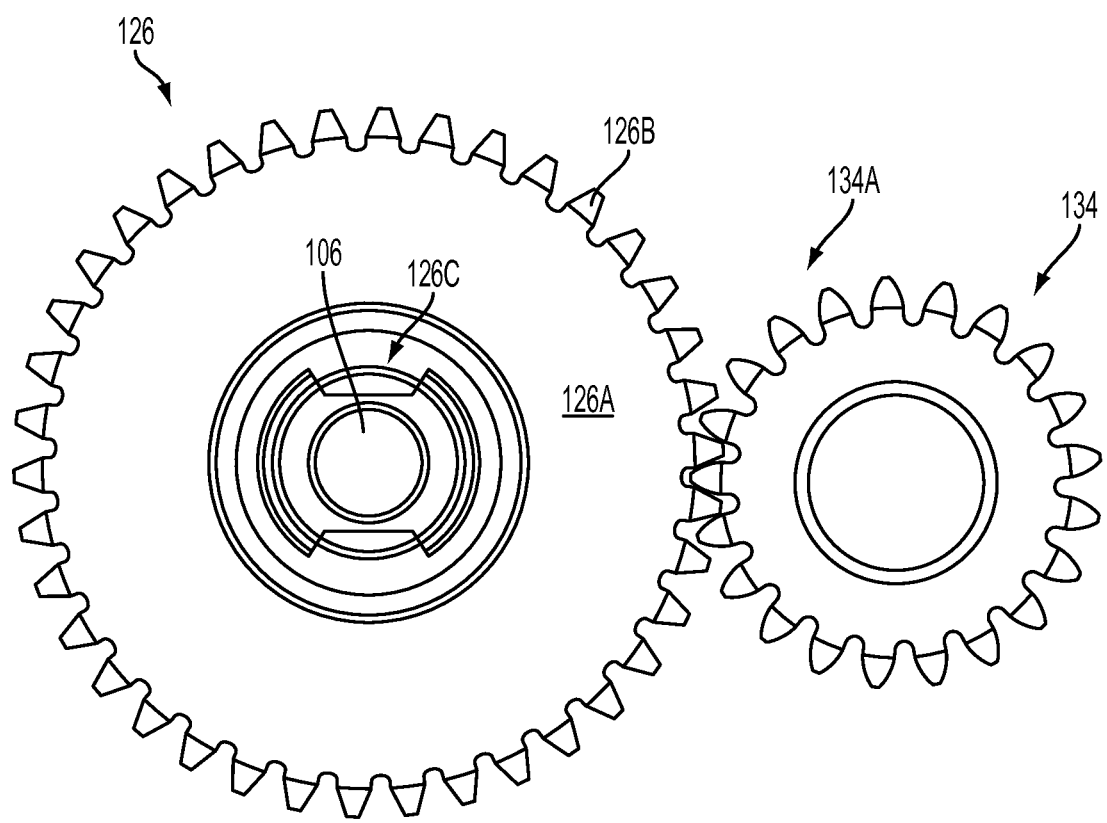
FIG. 6C is an end view of the output spindle of FIG. 6A illustrating a first gear mating with a pinion gear, according to some embodiments.

Referring now to FIG. 6C, an example gear is shown. For example, the second gear 126 includes a gear body 126A that includes a plurality of teeth 126B that extend from the gear body 126A. The gear body 126A includes a keyhole aperture 126C that allows the second gear 126 to couple with the output spindle 106.

The second armature pinion 134 is also illustrated and comprises teeth 134A which are configured to mesh with the plurality of teeth 126B of the second gear 126. The keyhole aperture 126C allows the second gear 126, when rotated, to rotate the output spindle 106. Additionally, the keyhole aperture 126C allows the second gear 126 to move forward and backward along the output spindle 106, which would not be possible if the second gear 126 was pressed onto the output spindle 106. It will be understood that the first gear 126 is also fabricated with a keyhole aperture. Note that the keyhole aperture can be any shape.

The output spindle 106 includes a gear coupling section 106A. The gear coupling section 106A extends end to end within the gearbox housing 118. The gear coupling section 106A has a shape that conforms to the keyhole apertures of the first and second gears.

Figure 7A:
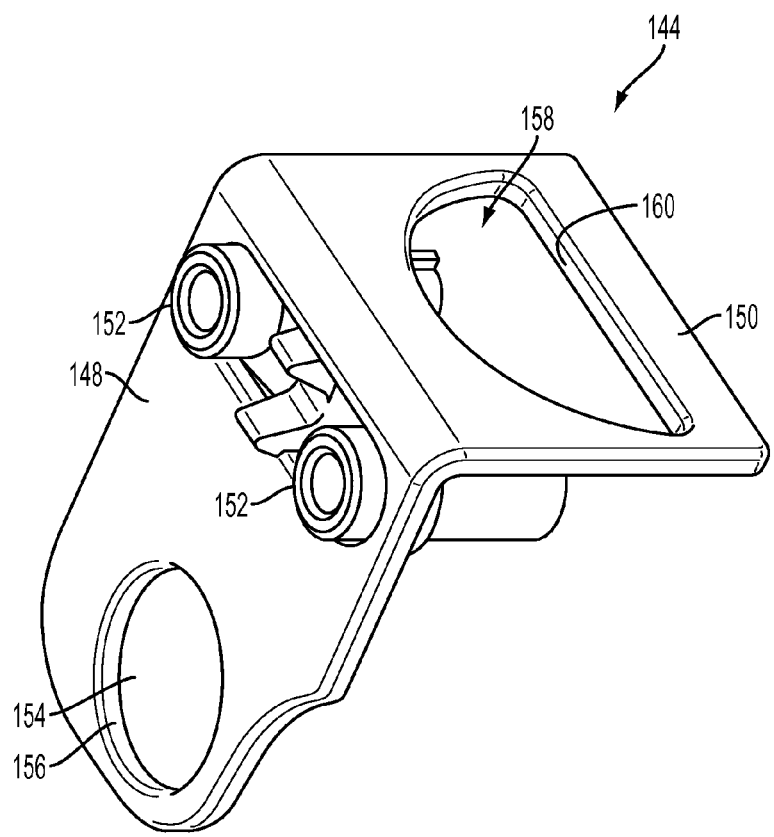
FIG. 7A is a perspective view of an example low speed bracket according to some embodiments.

Referring to FIGS. 7A-8B, the bracket assembly generally comprises a first bracket 144 and a second bracket 146. FIGS. 7A and 7B collectively illustrate the first bracket 144 (high speed bracket) which in some embodiments may be a substantially L-shaped component that comprises a support plate 148 that transitions to a top plate 150. The first bracket 144 also includes a pair of guide bushings 152 (identical to one another) that at least partially extend through the support plate 148. In one embodiment, the guide bushings 152 are tubular in shape and are sized to receive guide rails 136 and 138 of the transmission 102 (see FIG. 13).

Referring to FIG. 7A, the support plate 148 of the first bracket 144 includes an output spindle aperture 154 that is configured to receive the output spindle 106 therethrough. A diameter of the output spindle aperture 154 is slightly larger than a diameter of the output spindle 106 to ensure that the output spindle 106 can freely rotate. The diameter of the output spindle aperture 154 can be sized not only to accommodate for free rotation of the output spindle 106 but also any potential eccentric movement of the output spindle 106. That is, in the event that the output spindle 106 does not rotate in a perfect, balanced pattern, this potential imbalance may cause the output spindle 106 to wobble and contact a sidewall 156 of the output spindle aperture 154. Accordingly, the output spindle aperture 154 can be sized to accommodate for this potential eccentric movement. The exact size of the output spindle aperture 154 is dictated according to design requirements, such as any anticipated potential eccentric movement of the output spindle 106.

Figure 7B:
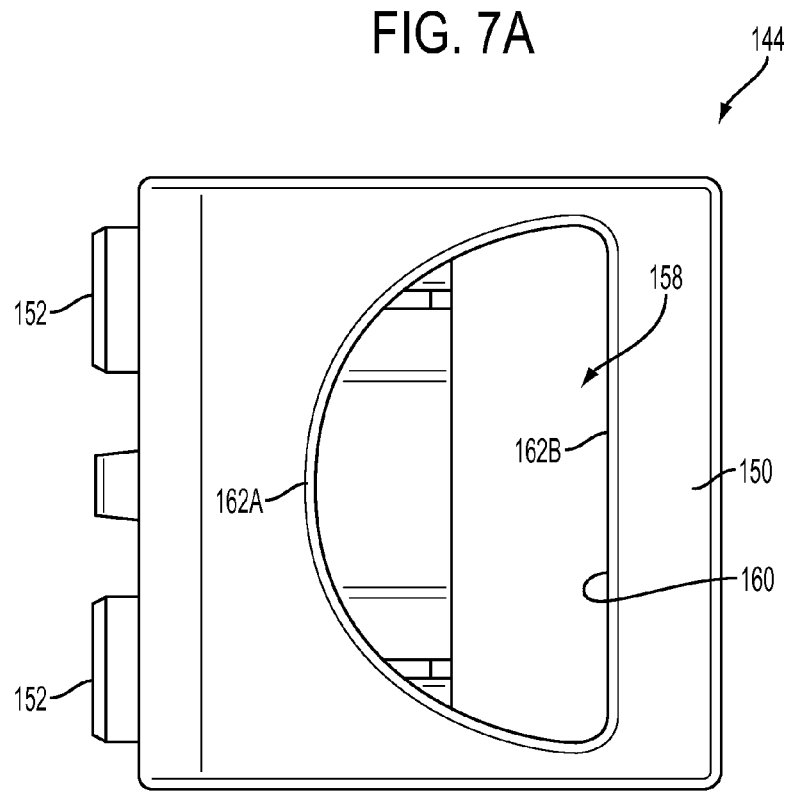
FIG. 7B is a top down view of the low speed bracket of FIG. 7A.

FIG. 7B illustrates the top plate 150 that comprises a high speed cam aperture 158. A shape of the high speed cam aperture 158 is defined by a high speed cam sidewall 160. In one embodiment, the high speed cam sidewall 160 is a substantially semi-circular shape with an apex edge 162A and one linear edge 162B. The shape of the high speed cam sidewall 160 facilitates selective engagement with the actuator 116 when the first bracket 144 and the second bracket 146 are in a high speed mode. The first bracket 144 translates forward and backward along the output spindle 106 in a linear direction that is substantially parallel to a linear axis L of the output spindle 106 (also see FIG. 6A).

Figure 8A:
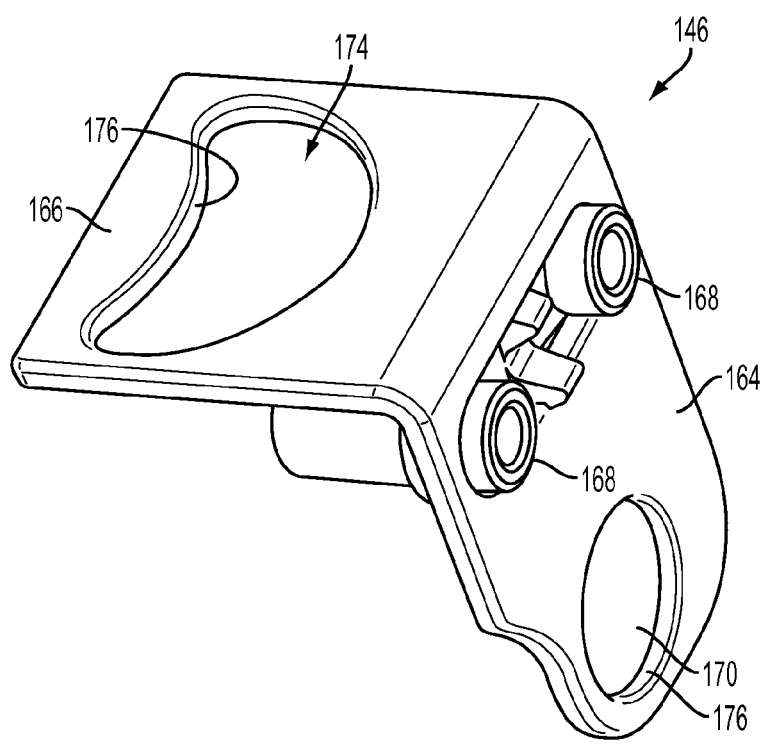
FIG. 8A is a perspective view of an example high speed bracket according to some embodiments.
Figure 8B:
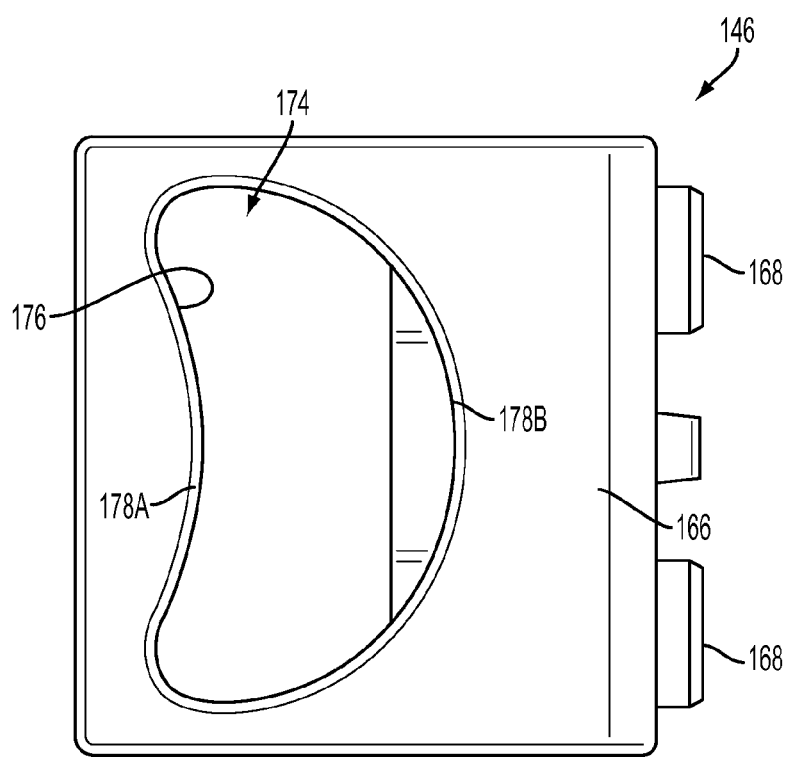
FIG. 8B is a top down view of the high speed bracket of FIG. 8A.

Referring to FIGS. 8A and 8B in some embodiments, the second bracket 146 (low speed bracket) is a substantially L-shaped component that comprises a support plate 164 that transitions to a top plate 166. In various embodiments, the second bracket 146 includes a pair of guide bushings 168 that at least partially extend through the support plate 164. The guide bushings 168 are tubular in shape and are sized to receive guide rails 136 and 138 of the transmission 102. The second bracket 146 translates forward and backward along the output spindle 106 in a linear direction that is substantially parallel to a linear axis L of the output spindle 106 (also see FIG. 6A).

In various embodiments, the support plate 164 includes an output spindle aperture 170 that is configured to receive the output spindle 106 therethrough. A diameter of the output spindle aperture 170 is slightly larger than a diameter of the output spindle 106 to ensure that the output spindle 106 can freely rotate. The diameter of the output spindle aperture 170 can be sized not only to accommodate for free rotation of the output spindle 106 but also any potential eccentric movement of the output spindle 106. That is, the output spindle 106 may not rotate in a perfect, balanced pattern. This potential imbalance may cause the output spindle 106 to wobble and contact a sidewall 172 of the output spindle aperture 170. Thus, the output spindle aperture 170 can be sized to accommodate for this potential eccentric movement. The exact size of the output spindle aperture 170 is dictated according to design requirements, such as any anticipated or potential eccentric movement of the output spindle 106.

Referring to FIG. 8B, in some embodiments the top plate 166 may include a low speed cam aperture 174. The shape of the low speed cam aperture 174 is defined by a low speed cam sidewall 176. In one embodiment, the low speed cam sidewall 176 is substantially moon shaped with a convex edge 178A and a concave edge 178B. The shape of the low speed cam sidewall 176 facilitates selective engagement with the actuator 116 of the transmission when the first bracket 144 and the second bracket 146 are placed into low speed position.

Returning to FIG. 6A, the first bracket 144 and the second bracket 146 are shown in a mating relationship. The top plate 150 of the first bracket 144 is positioned below the top plate 166 of the second bracket 146, such that the top plate 166 of the second bracket 146 overlaps the top plate 150 of the first bracket 144.

The first bracket 144 and the second bracket 146 are installed on the guide rails 136 and 138 (only guide rail 136 being shown in FIG. 6A) and extend through the guide bushings 152 of the first bracket 144 and the guide bushings 168 of the second bracket 146.

A pair of grommets 182A and 182B (see FIGS. 4 and 5 to see both grommets 182A and 182B) is associated with the gearbox housing 118. The guide rails 136 and 138 extend slightly through the gearbox housing 118 into the pair of grommets 182A and 182B. The pair of grommets 182A and 182B support the guide rails 136 and 138 at their terminal ends.

In FIG. 6A, the transmission 102 is shown in the neutral position. When the transmission 102 is in the neutral position, the first bracket 144 is adjacent the gearbox cover 120. That is, the gearbox cover 120 acts as a stop when the support plate 148 of the first bracket 144 contacts the gearbox cover 120. In one embodiment, the guide bushings 152 of the first bracket 144 contact the gearbox cover 120, stopping the first bracket 144 from further movement away from the second bracket 146.

The gearbox cover 120 is also referred to as a first bracket stop. The second bracket 146 is located next to an inner surface 184 of the gearbox housing 118 when the transmission 102 is in the neutral position. In one embodiment, the guide bushings 168 of the second bracket 146 contact the inner surface 184 of the gearbox housing 118, stopping the second bracket 146 from further movement away from the first bracket 144.

In various embodiments, the inner surface 184 of the gearbox housing 118 is also referred to as a second bracket stop.

The first gear 124 and the second gear 126 are positioned between the first and second brackets 144 and 146. The first gear 124 and the second gear 126 are held in spaced apart relationship to one another by a gear spacer 128. In one embodiment, the gear spacer 128 includes a compression spring that resiliently biases the first gear 124 and the second gear 126 away from one another. The gear spacer 128 also moves the first bracket 144 proximate the gearbox cover 120 and the second bracket 146 proximate the inner surface 184 of the gearbox housing 118. In this position the first armature pinion 132 and the second armature pinion 134 are disposed between the first gear 124 and the second gear 126.

The gear spacer 128 is allowed to move the brackets and gears when the actuator 116 is in a neutral (third) position. That is, when the actuator 116 is in the third position, the gear spacer 128 is allowed to extend, which pushes the brackets away from one another (as well as the gears).

FIG. 6B also illustrates a gear collar 128A that cooperates with the gear spacer 128 to control the spacing of the first and second gears 124 and 126. In one embodiment, the gear collar 128A functions to limit how closely together the first and second gears 124 and 126 are in various positions. In low speed position, the second gear 126 is moved into alignment with the second armature pinion 134, while the first gear 124 remains proximate the gearbox cover 120. The gear collar 128A prevents the second gear 126 from moving too closely to the first gear 124, which would move the second gear 126 out of alignment with the second armature pinion 134.

In contrast with the gear spacer 128, which functions to push the gears 124 and 126 away from one another, the gear collar 128A functions to regulate the spacing of the gears 124 and 126 relative to one another. The length of the gear collar 128A is configured to ensure that the second gear 126 aligns with the second armature pinion 134 when the actuator 116 is placed in low speed mode. The gear collar 128A also ensures that the first gear 124 aligns with the first armature pinion 132 when the actuator 116 is placed in high speed mode.

Figure 9:
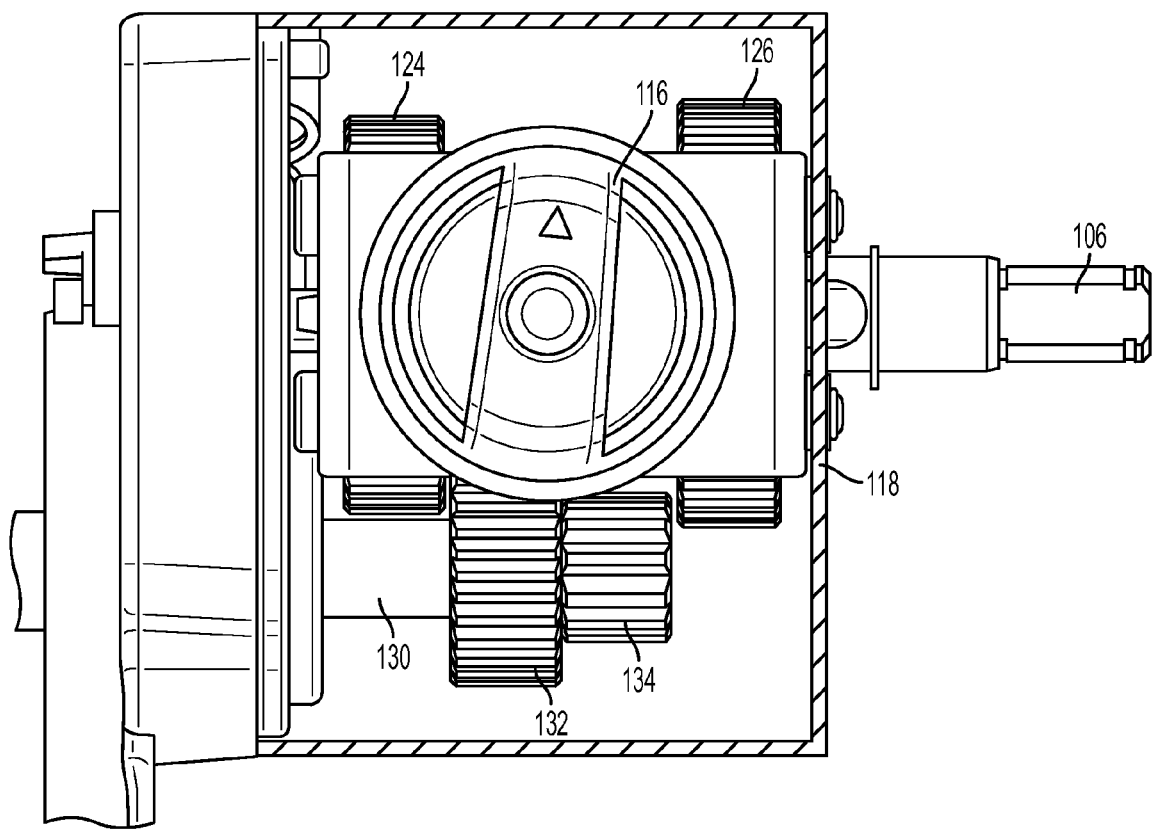
FIG. 9 is a top down cross-sectional view of FIG. 6A illustrating an example actuator being in a neutral position in accordance with at least one embodiment.

FIG. 9 illustrates the actuator 116 in a neutral position, with the first armature pinion 132 and the second armature pinion 134 being disposed between the first gear 124 and the second gear 126.

Because neither the first armature pinion 132 nor the second armature pinion 134 are engaged with the first and second gears 124 and 126, any rotational input applied to the armature shaft 130 will cause the armature shaft 130 to rotate while the output spindle 106 remains stationary.

In some embodiments, the first gear 124 is smaller in diameter than the second gear 126 (see FIGS. 9, 10, 13, 14, and 19). The first gear 124 is smaller in diameter than the second gear 126 so that the first gear 124 can engage with the first armature pinion 132, which is larger in diameter than the second armature pinion 134. Because, in some example embodiments the first and second gears 124 and 126 can only translate linearly along the output spindle 106 and the first and second armature pinions 132 and 134 are stationary (e.g., no linear movement), the first gear 124 and the first armature pinion 132 are sized such that they engage when the first gear 124 is slid into contact with the first armature pinion 132 by translation of the first gear 124 along the output spindle 106. Similarly, the second gear 126 and the second armature pinion 134 are sized such that they engage when the second gear 126 is slid into contact with the second armature pinion 134 by translation of the second gear 126 along the output spindle 106.

Stated otherwise, the first gear 124 is smaller in diameter than the second gear 126 because the first armature pinion 132 is larger in diameter than the second armature pinion 134.

Figure 10:
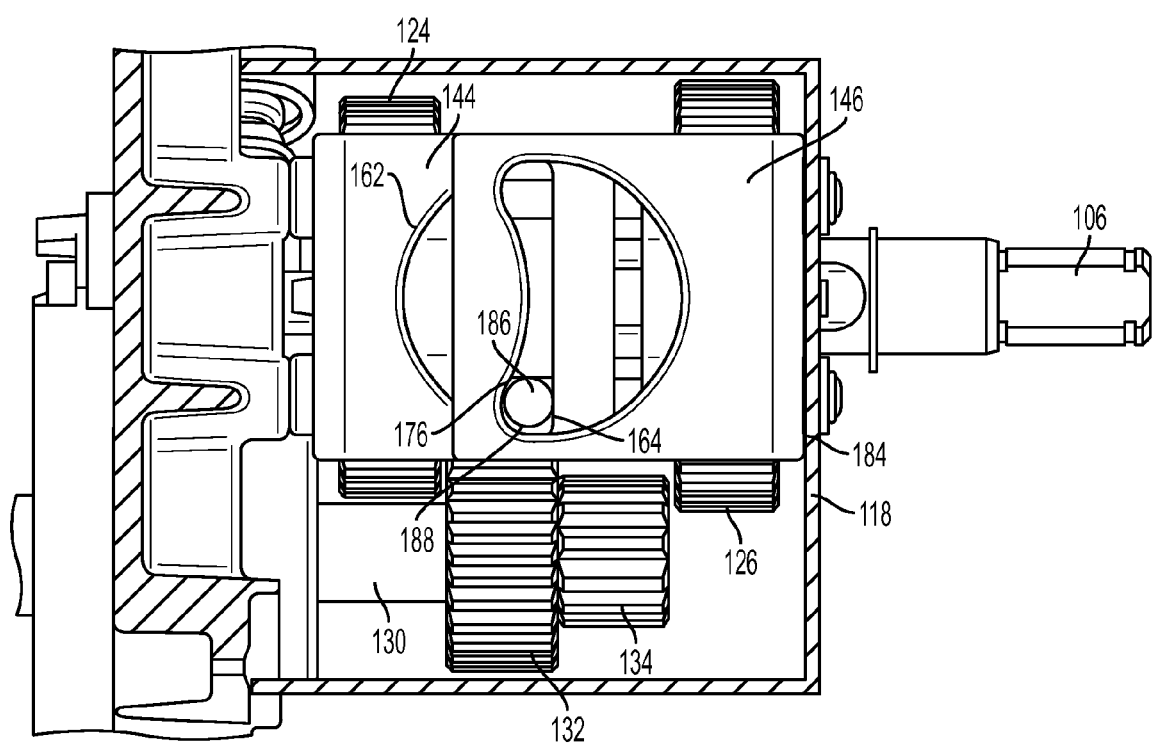
FIG. 10 is a top down cross-sectional view of FIG. 9 with the actuator removed to show positioning of the first and second brackets, in the neutral position.
Figure 11:
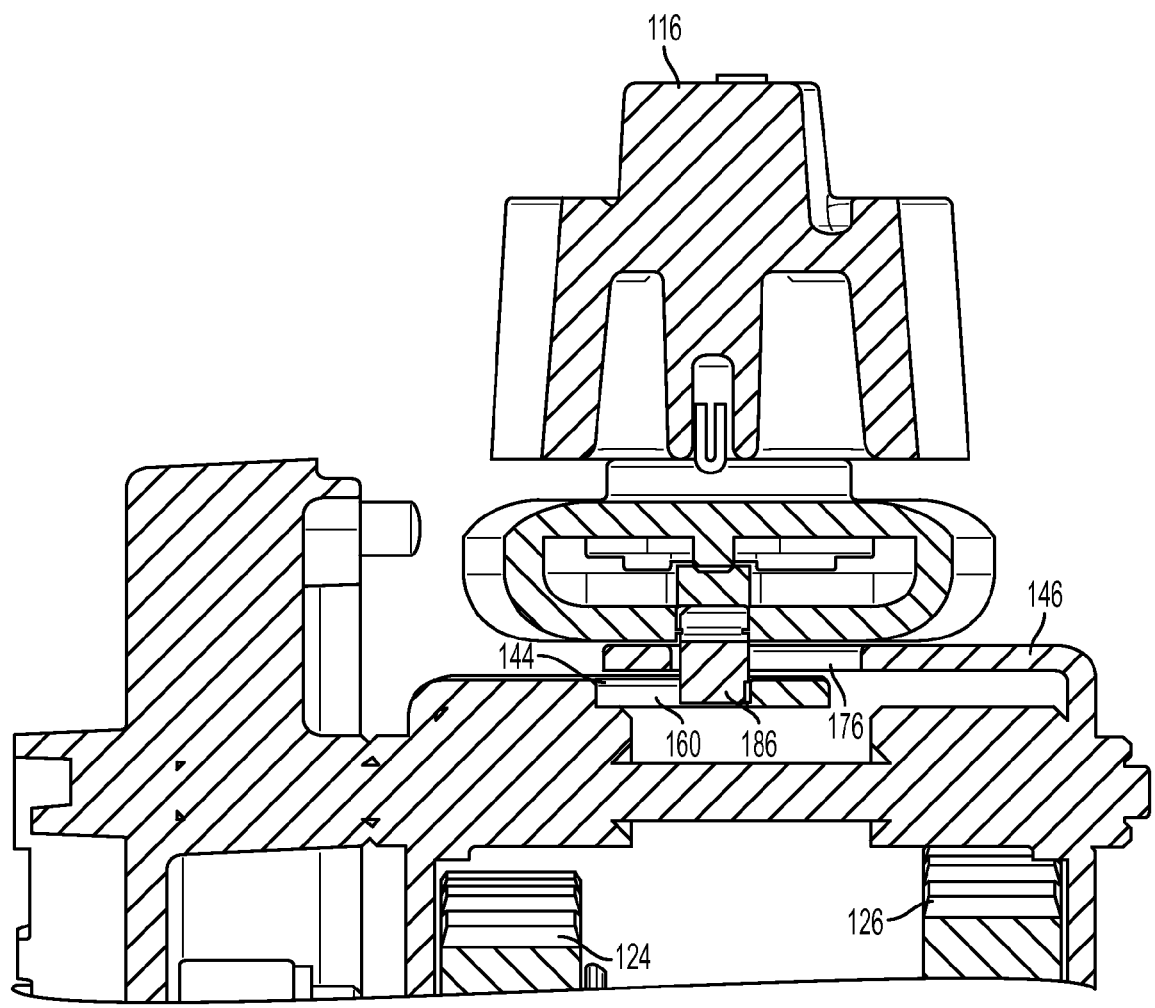
FIG. 11 is a cross sectional view illustrating a pin of the actuator when the transmission is in the neutral position.

FIGS. 10 and 11 show an example arrangement of the first bracket 144 and the second bracket 146 when a pin 186 of the actuator 116 is in the neutral position. The pin 186 clears the low speed cam sidewall 176 and is shown disposed near a curved section 188 of the low speed cam sidewall 176. Similarly, the pin 186 is located near the linear edge 162B of the high speed cam sidewall 160. This arrangement allows the support plate 148 of the first bracket 144 to translate to the gearbox cover 120 and the support plate 164 of the second bracket 146 to translate to the inner surface 184 of the gearbox housing 118. The pin 186 of the actuator 116 is exerting little to no force on either the low speed cam sidewall 176 or the high speed cam sidewall 160, allowing the gear spacer 128 to fully extend, pushing both first and second gears 124 and 126 outwardly from one another.

Figure 12A:
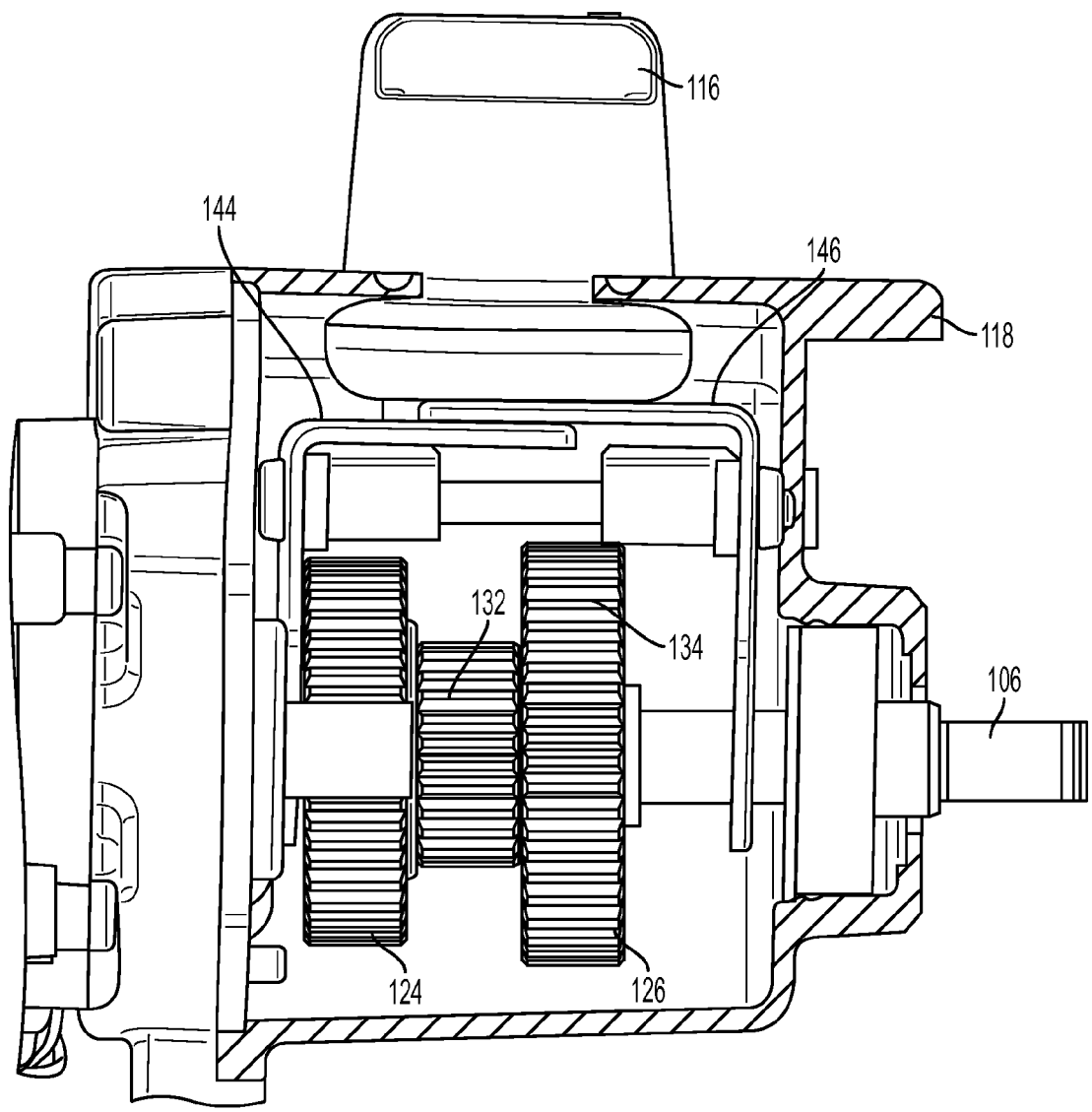
FIG. 12A is a partial cross-sectional view of the transmission of FIGS. 2 and 4-5 illustrating the transmission being in a low speed position.
Figure 12B:
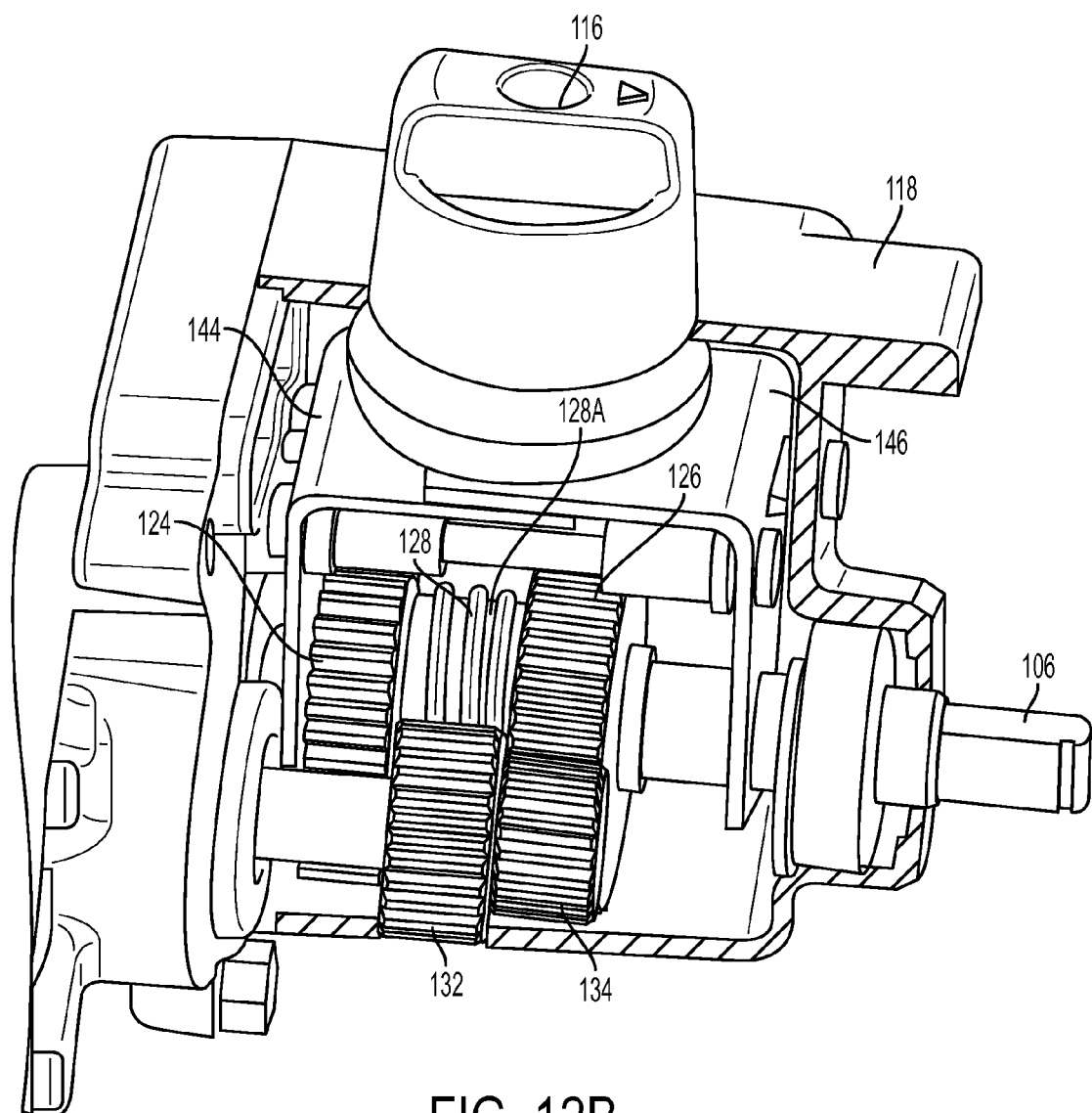
FIG. 12B is a partial perspective, cross-sectional view transmission of FIG. 12A, illustrating the transmission being in a low speed position.
Figure 13:
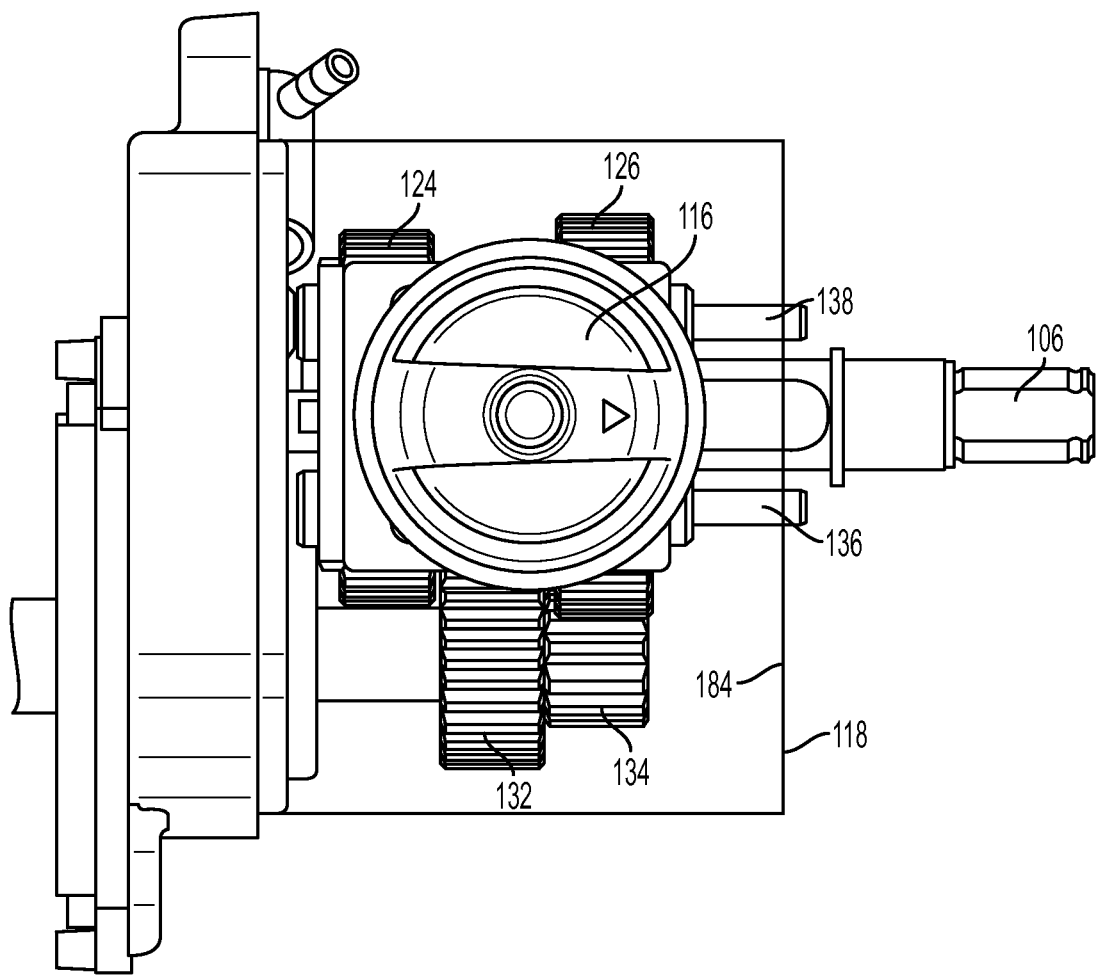
FIG. 13 is a top down cross-sectional view of FIG. 12 illustrating an actuator being in the low speed position.

FIGS. 12A, 12B, and 13 illustrates the actuator 116 in a second position where the second armature pinion 134 is engaged with the second gear 126 and first gear 124 freely rotates. The first armature pinion 132 is disposed between the first and second gears 124 and 126 in a freely rotating position.

The first bracket 144 is proximate the gearbox cover 120 while the second bracket 146 is translated towards the first bracket 144. The second bracket 146 translates from its high speed and neutral position (proximate the inner surface 184 of the gearbox housing 118) to a low speed position where the second armature pinion 134 is substantially aligned with the second gear 126 such that teeth of the second armature pinion 134 and teeth of the second gear 126 engage. This engagement allows rotation of the second armature pinion 134 to be translated to the second gear 126 causing the second gear 126 to rotate the output spindle 106 at a second rate of rotation (also referred to as low speed mode).

Figure 14:
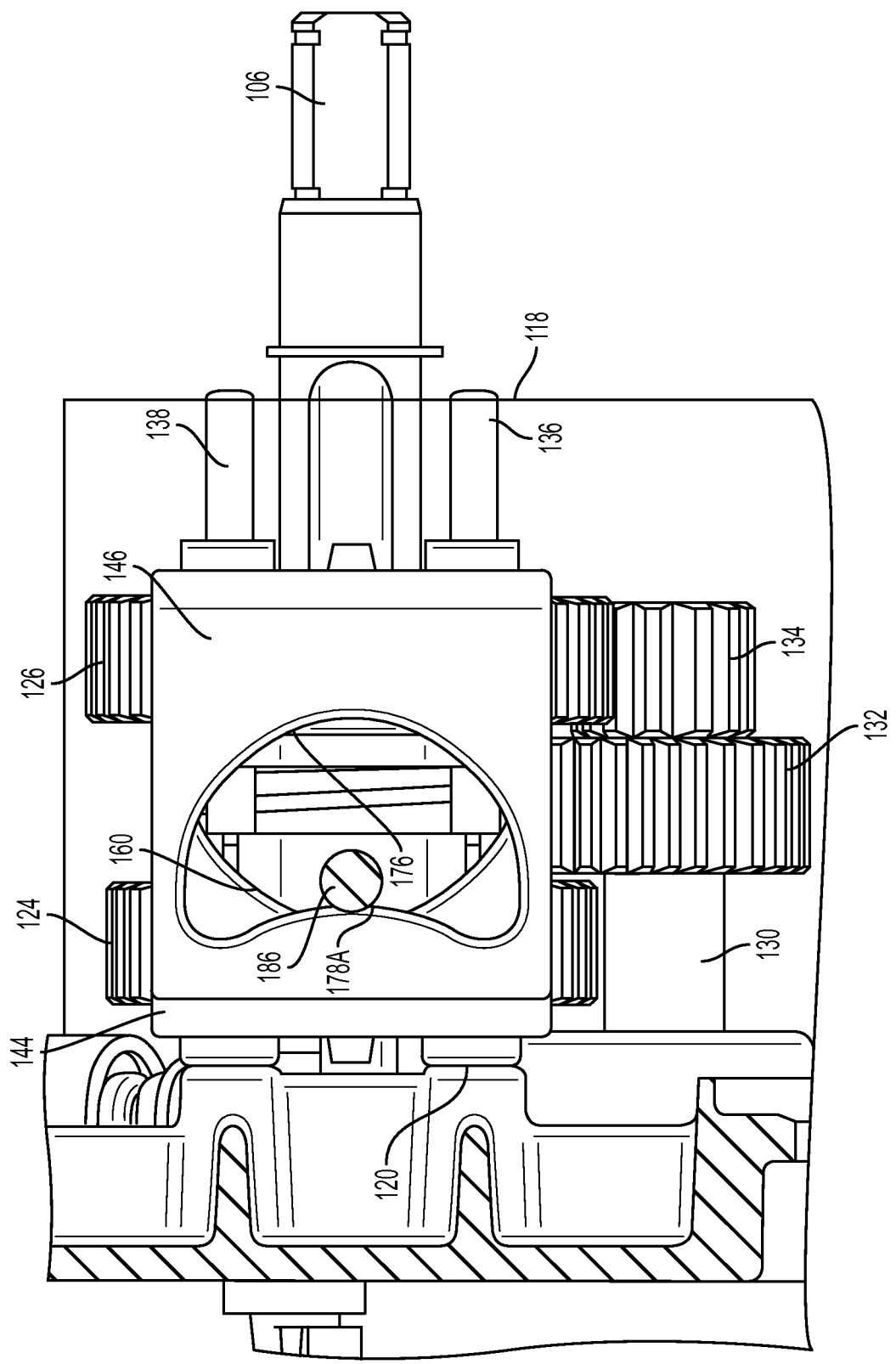
FIG. 14 is a top down cross-sectional view of FIG. 13 with the actuator removed to show positioning of the first and second brackets, in the low speed position.
Figure 15:
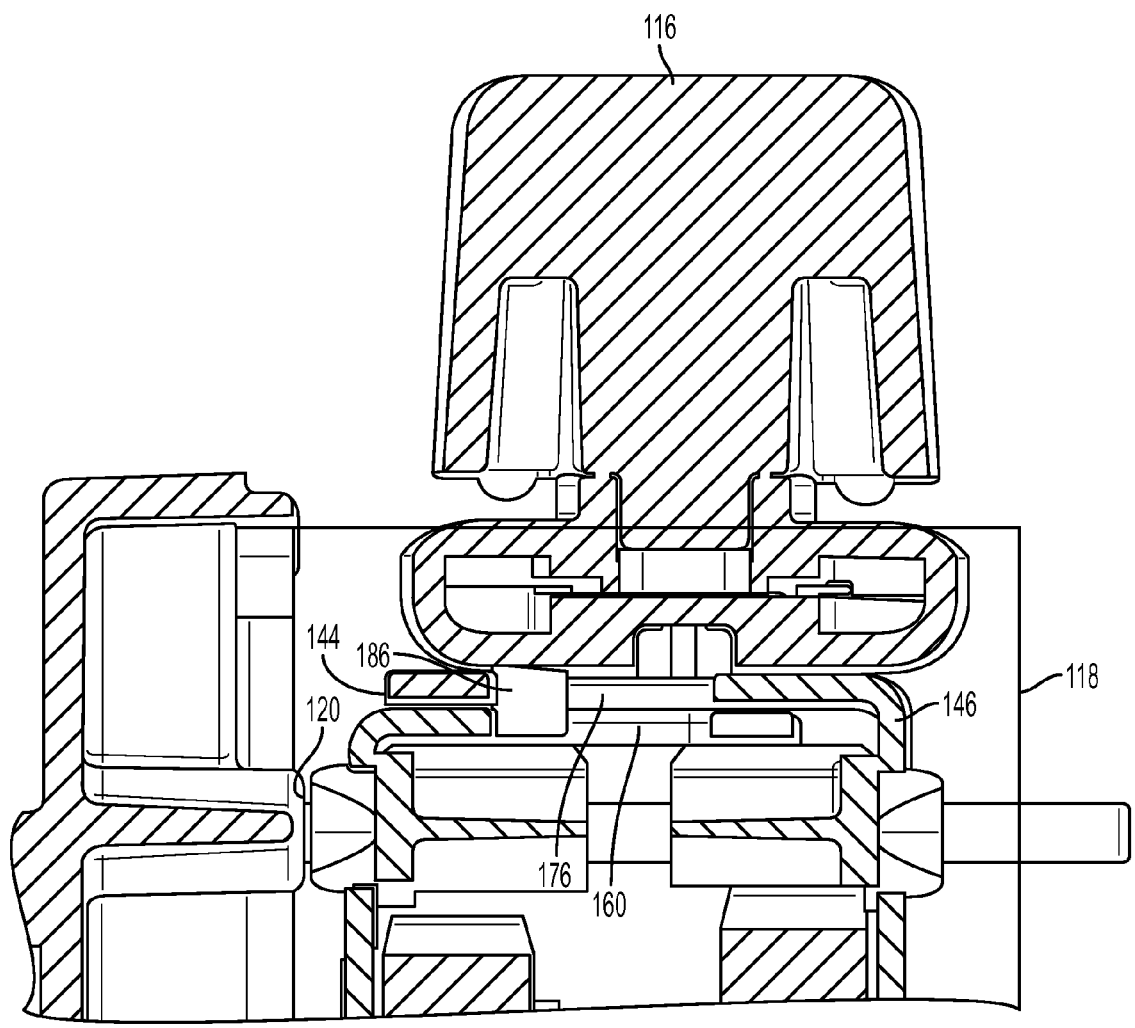
FIG. 15 is a cross sectional view illustrating a pin of the actuator engaging with a low speed bracket, but not the high speed bracket.

Referring to FIG. 14, the pin 186 contacts the convex edge 178A of the low speed cam sidewall 176 of the second bracket 146. As best illustrated in FIG. 15, the pin 186 does not (or barely contacting) the high speed cam sidewall 160 of the first bracket 144.

Movement of the actuator 116 from a neutral position to the low speed mode moves the pin 186 from neutral position as illustrated in FIGS. 10 and 11, to the low speed mode of FIGS. 12A-15. When the actuator 116 is moved from the neutral position to the low speed mode, the pin 186 traces along the high speed cam sidewall 160 and the low speed cam sidewall 176, until the pin 186 no longer contacts the high speed cam sidewall 160 and contacts only the low speed cam sidewall 176 near a middle of the convex edge 178A of the low speed cam sidewall 160. This movement of the pin 186 causes the second bracket 146 to move towards the first bracket 144, compressing the gear spacer 128. The movement of the second bracket 146 towards the first bracket 144 causes the second gear 126 to engage with the second armature pinion 134. The gear collar 128A stops the second gear 126 in such a way that the second gear 126 and second armature pinion 134 align.

Figure 16A:
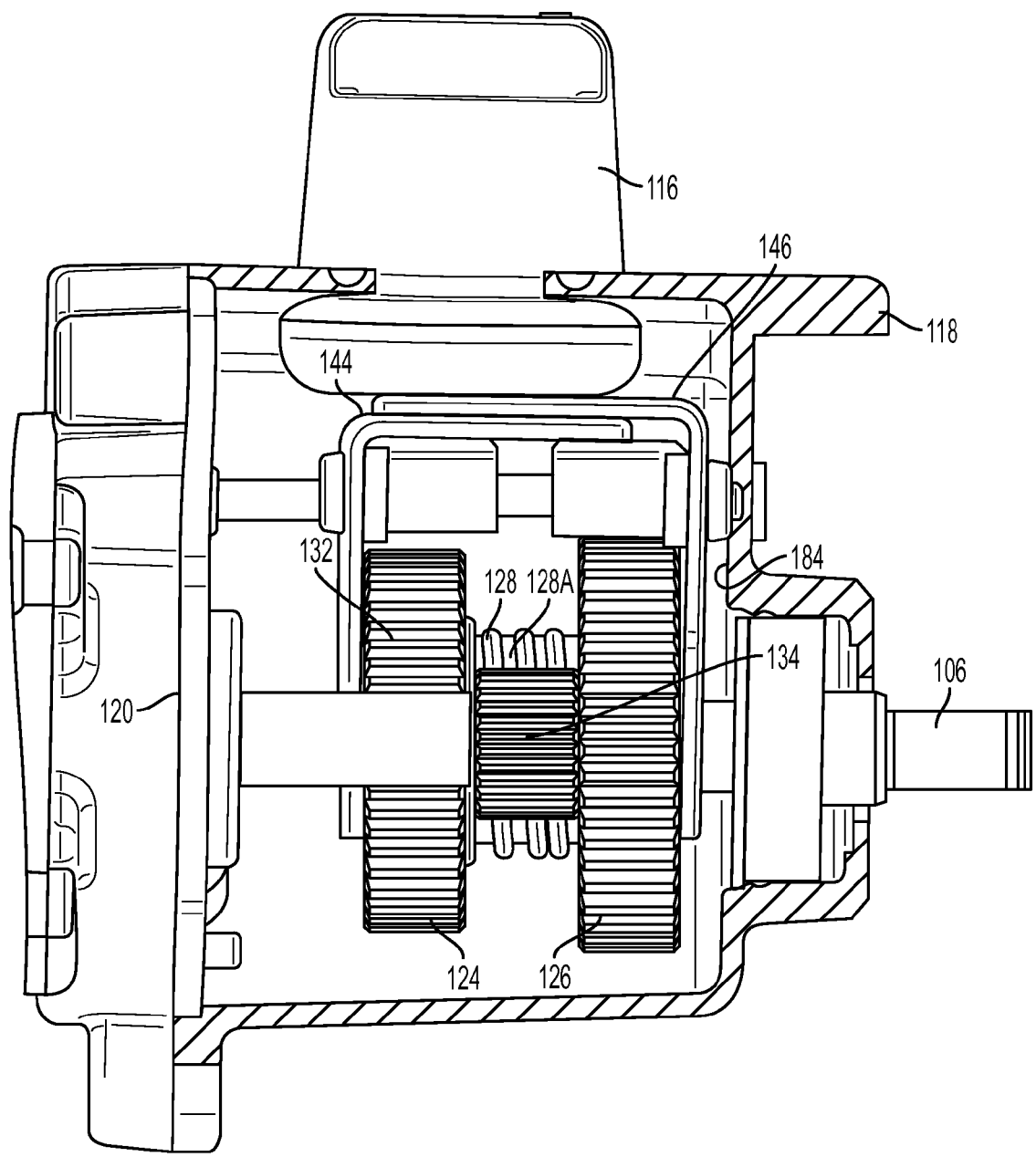
FIG. 16A is a partial perspective of the transmission of FIGS. 2 and 4-5 illustrating the transmission being in a high speed position.
Figure 16B:
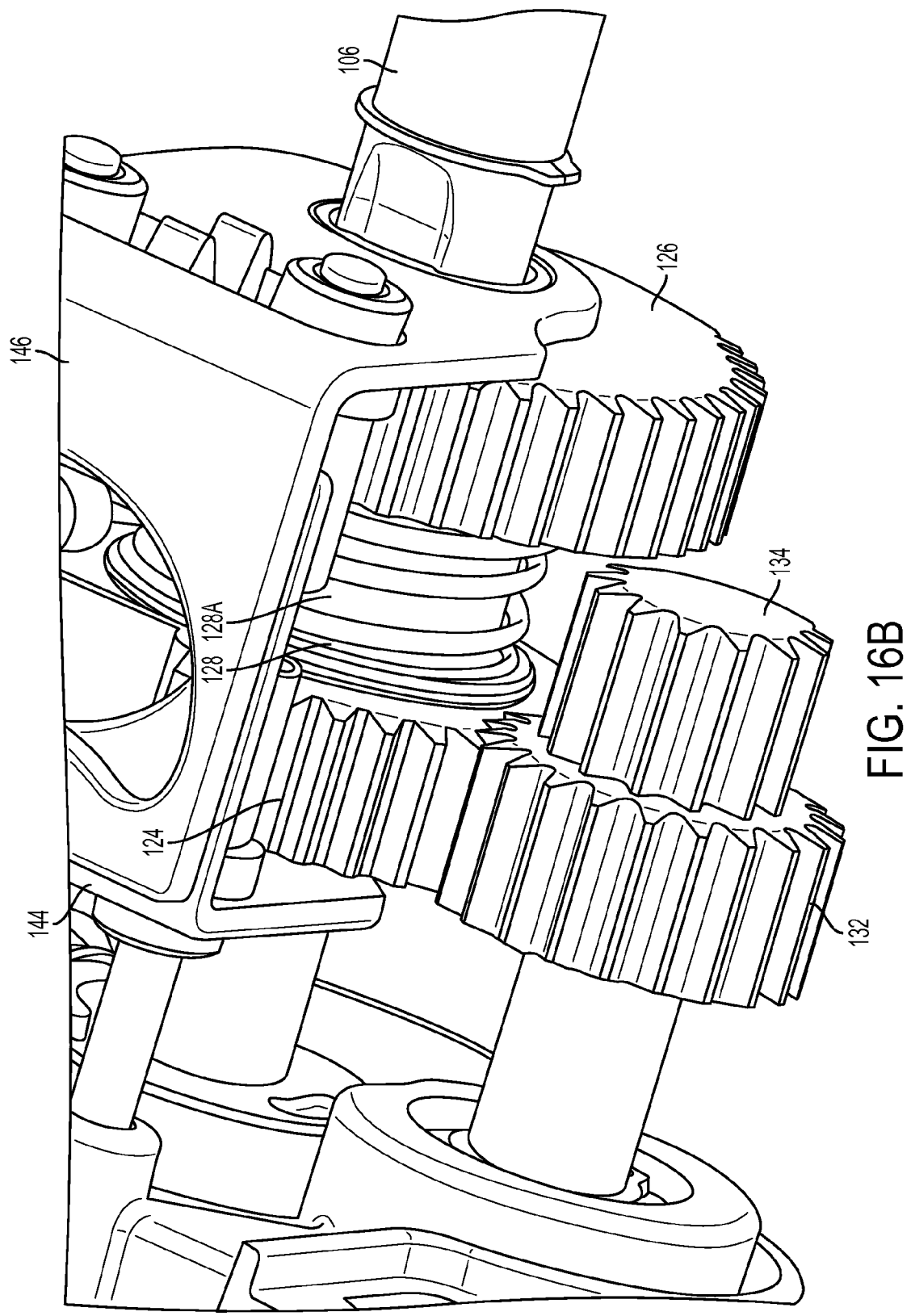
FIG. 16B is a partial perspective, cross-sectional view transmission of FIG. 126A, illustrating the transmission being in a high speed position.
Figure 17:
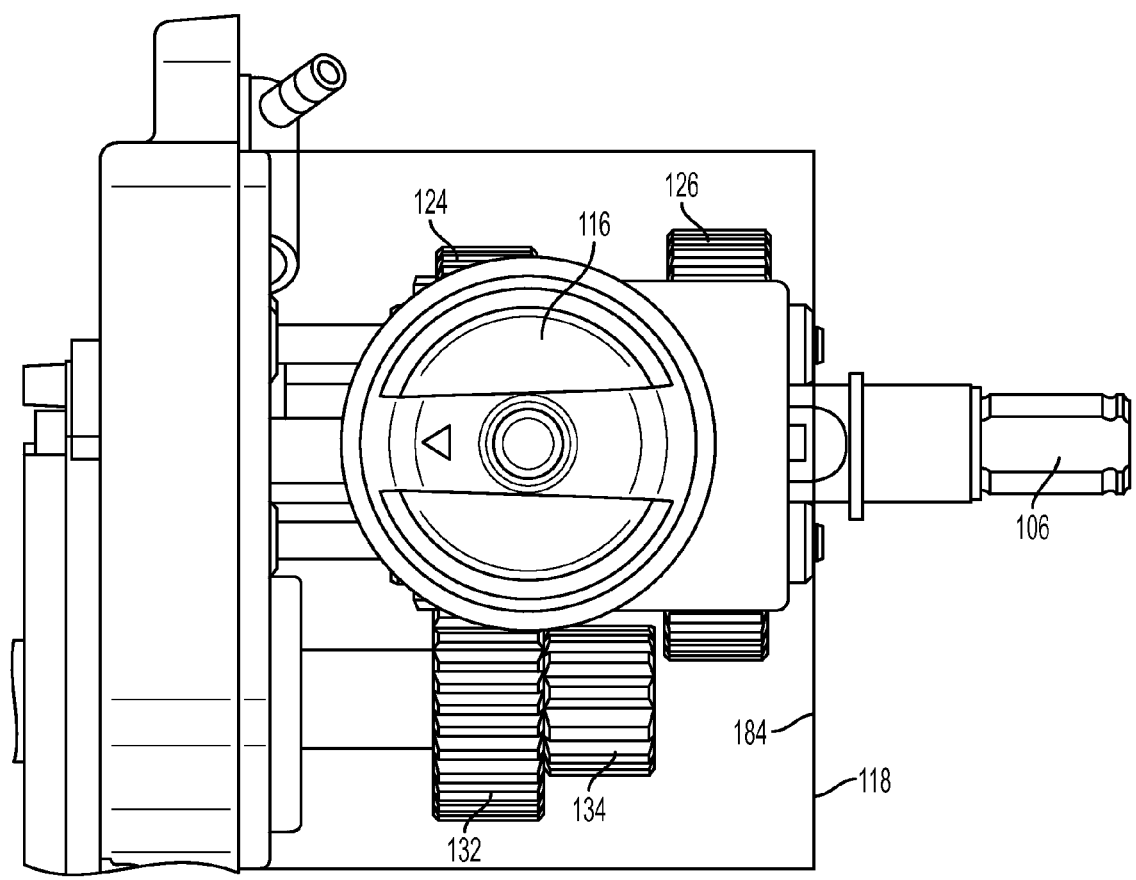
FIG. 17 is a top down cross-sectional view of FIG. 16 illustrating an actuator being in the high speed position.

FIGS. 16 and 17 illustrate an example embodiment of the transmission 102 in a high speed mode. In this configuration the first armature pinion 132 is engaged with the first gear 124 allowing the second gear 126 to rotate freely (not being in contact with the second armature pinion 134). The second armature pinion 134 is disposed between the first and second gears 124 and 126 in a freely rotating position.

The second bracket 146 is proximate the inner surface 184 of the gearbox housing 118 while the first bracket 144 is translated towards the second bracket 146. The first bracket 144 translates from its neutral and low speed positions (proximate the gearbox cover 120) to a high speed mode where the first armature pinion 132 is substantially aligned with the first gear 124 such that teeth of the first armature pinion 132 and teeth of the first gear 124 engage. This engagement allows rotation of the first armature pinion 132 to be translated to the first gear 124 causing the first gear 124 to rotate the output spindle 106 at a first rate of rotation (high speed mode).

Figure 18:
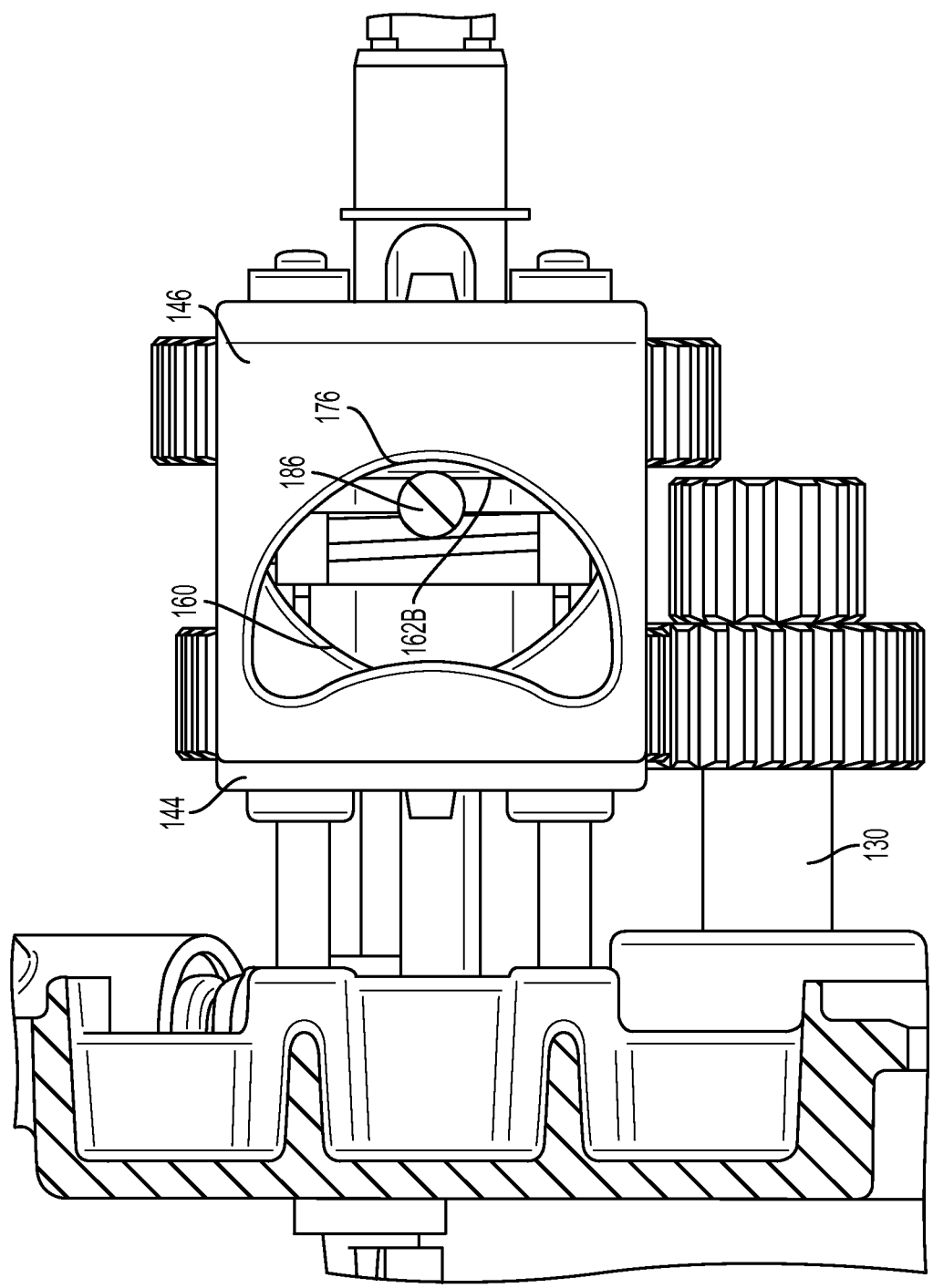
FIG. 18 is a top down cross-sectional view of FIG. 17 with the actuator removed to show positioning of the first and second brackets, in the high speed position.
Figure 19:
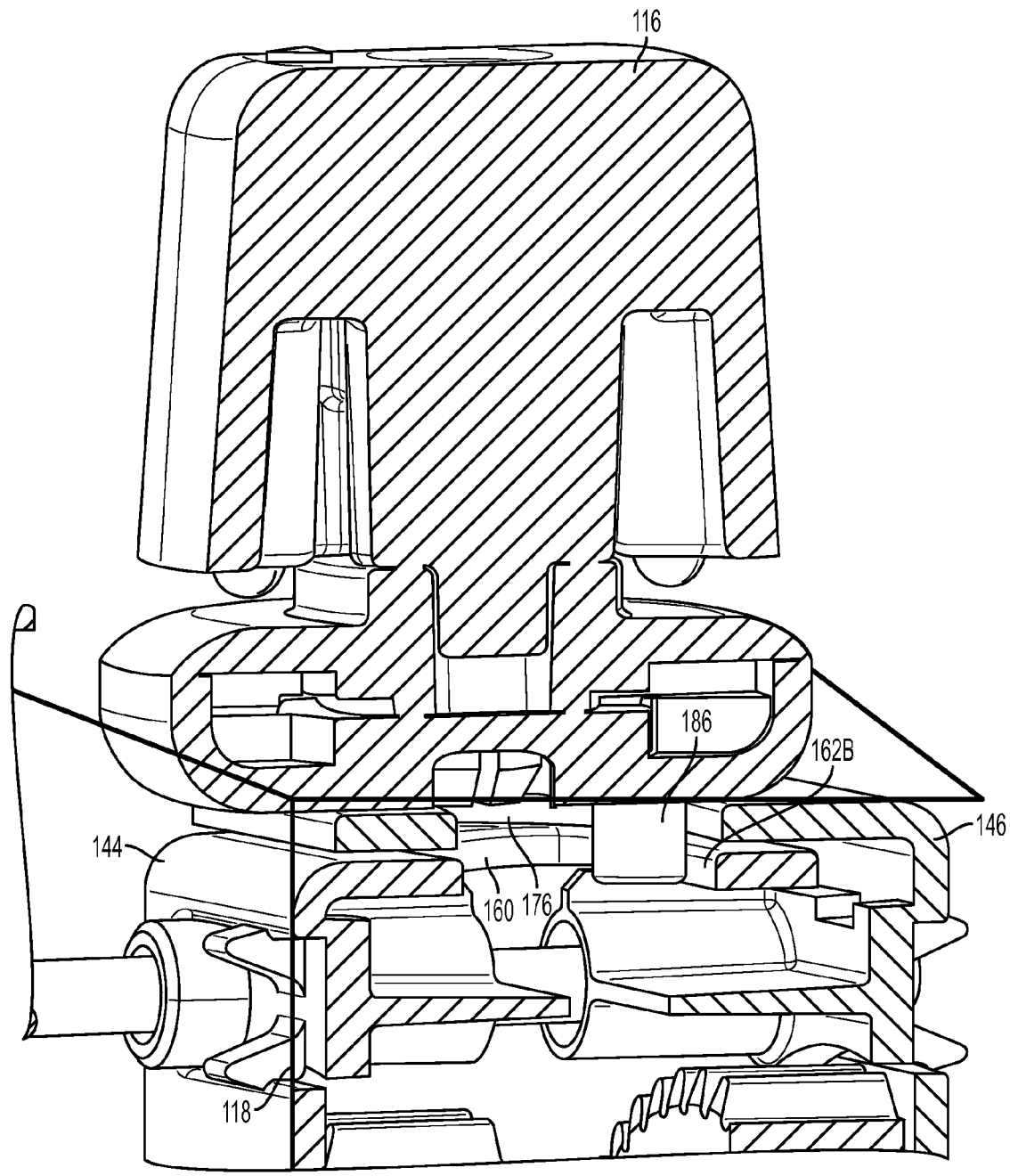
FIG. 19 is a cross sectional view illustrating an example pin of the actuator engaging with a high speed bracket, but not the low speed bracket, according to some embodiments.

Referring to FIG. 18, the pin 186 contacts the linear edge 162B of the high speed cam sidewall 160 of the first bracket 144. Referring now to FIG. 19, in an example embodiment the pin 186 contacts the linear edge 162B of the high speed cam sidewall 160 of the first bracket 144 without contacting the low speed cam sidewall 176 of the second bracket 146. In some embodiments the pin 186 contacts the linear edge 162B of the high speed cam sidewall 160 of the first bracket 144 and barely contacts the low speed came sidewall 176 of the second bracket 146.

In some embodiments, when the actuator 116 is moved from the neutral position to the high speed mode, the pin 186 traces along the high speed cam sidewall 160 and the low speed cam sidewall 176, until the pin 186 no longer contacts the low speed cam sidewall 176 and contacts only the high speed cam sidewall 160 near a middle of the linear edge 162B of the high speed cam sidewall 160. This movement of the pin 186 causes the first bracket 144 to move towards the second bracket 146, compressing the gear spacer 128. The movement of the first bracket 144 towards the second bracket 146 causes the first gear 124 to engage with the first armature pinion 132. Again, this movement is limited by the gear collar 128A. When rotational input is applied to the armature shaft 130, the first armature pinion 132 transfers the rotational input to the first gear 124.

In some embodiments, the first rate of rotation caused by the first gear 124 engaging with the first armature pinion 132 is greater than the second rate of rotation caused by the second gear 126 engaging with the second armature pinion 134.

Figure 20:
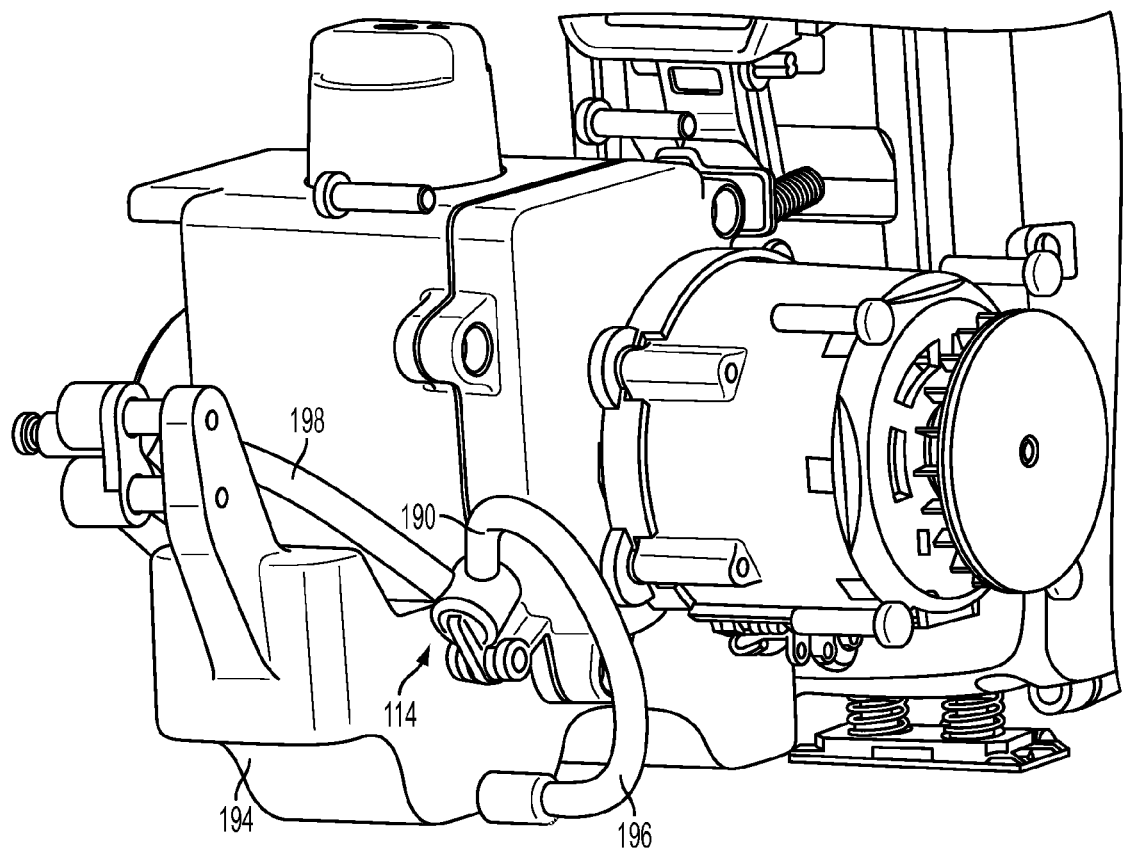
FIG. 20 is a perspective view of the transmission of FIGS. 2 and 4-5, illustrating an example oil pump assembly, in accordance with at least one embodiment.
Figure 21:
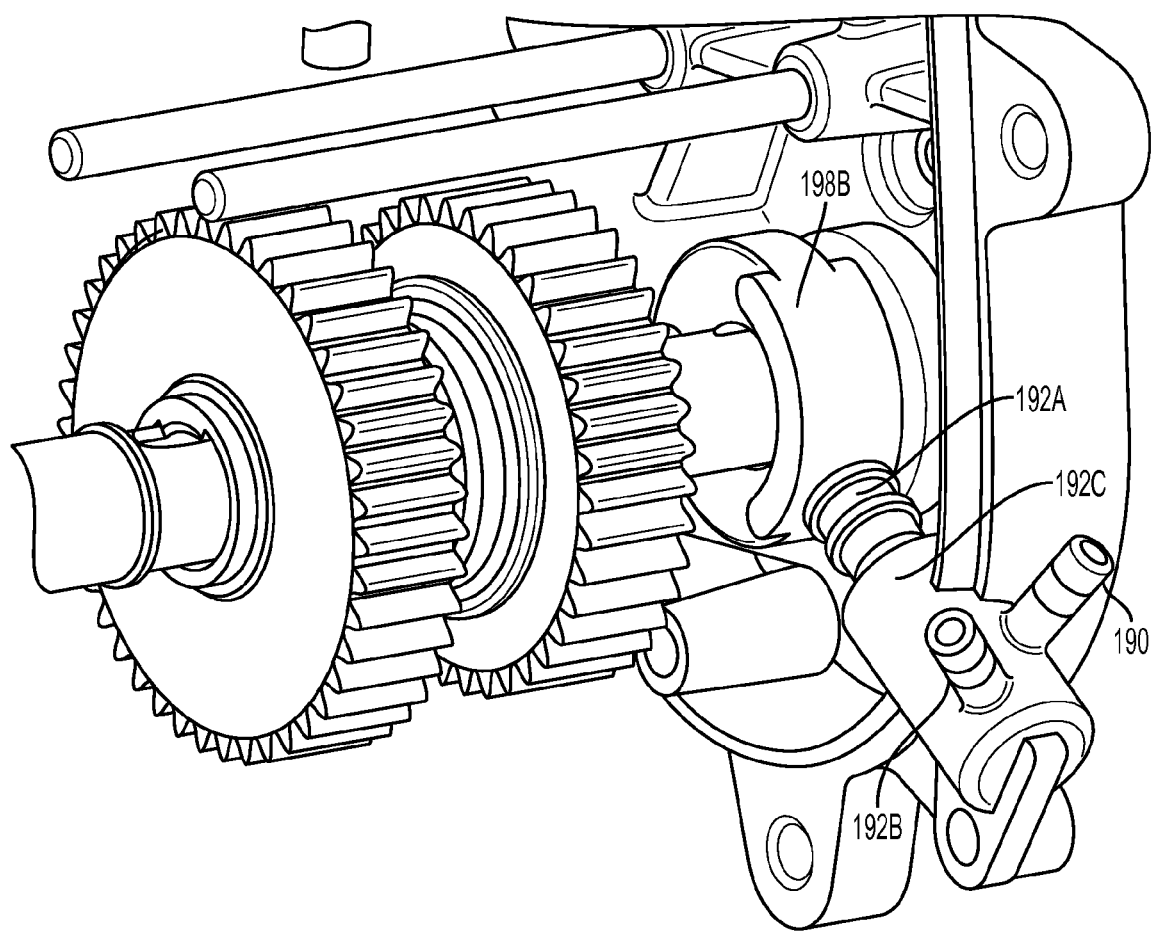
FIG. 21 is a cutaway perspective view of the transmission of FIGS. 2 and 4-5, illustrating an oil pump associated with the output spindle.

FIGS. 20 and 21 illustrate an example embodiment of the oil pump assembly 114. In some embodiments, the oil pump assembly 114 may include an oil pump inlet 190, a first oil pump output 192A, a second oil pump output 192B, a reservoir 194, an inlet hose 196, and an outlet hose 198. The reservoir 194 receives and retains a lubricating fluid such as oil. The oil is delivered from the reservoir 194 to the oil pump inlet 190. The second oil pump output 192A provides oil to the cutting member 104 (FIG. 2) using the outlet hose 198. The first oil pump output 192A provides oil to the output spindle 106 through a path or shunt 192C, which delivers oil to an oil bearing 198. The oil bearing 198 encircles the output spindle 106 and delivers oil to the output spindle 106.

The first and second oil pump outlets 192A and 192B are operated by rotation of the output spindle 106. For example, when the output spindle 106 rotates, the first and second oil pump outlets 192A and 192B deliver oil to the cutting member 104 and the output spindle 106, respectively. When the transmission 102 operates at the first rate of rotation (high speed mode), the first and second oil pump outlets 192A and 192B output oil at a first flow rate. When the transmission 102 operates at the second rate of rotation (low speed mode), the first and second oil pump outlets 192A and 192B output oil at a second flow rate. In one embodiment, the second flow rate is lower than the first flow rate.

Figure 22:
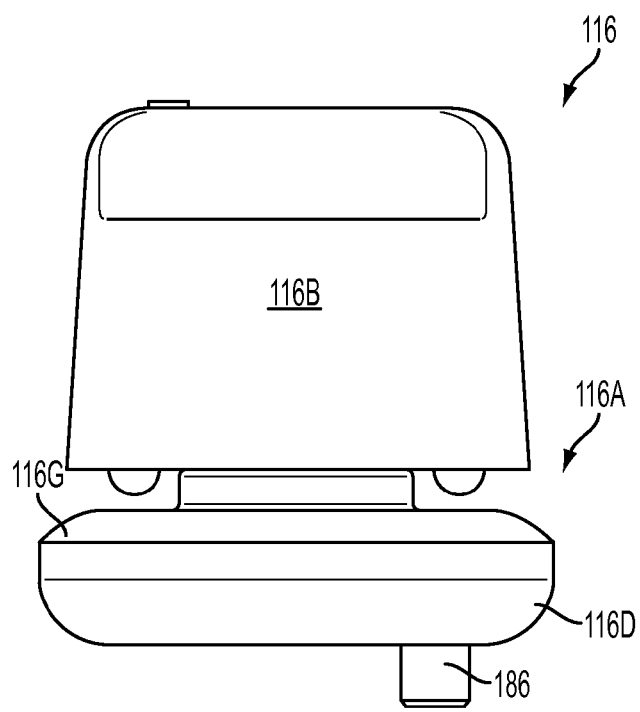
FIG. 22 is a perspective view of an example actuator with a pin, according to some embodiments.
Figure 23:
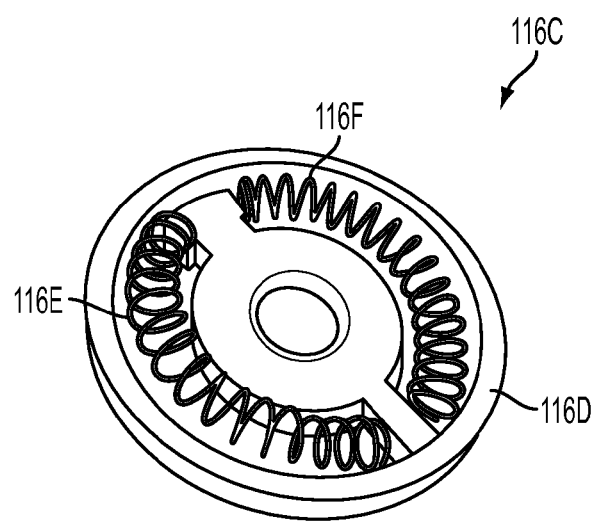
FIG. 23 is a perspective view of an actuator spring that is disposed within the actuator of FIG. 22.

FIGS. 22 and 23 illustrate an example embodiment of an actuator 116. FIG. 22 illustrates the actuator 116 in an assembled configuration. The actuator 116 includes the pin 186, a housing 116A, a knob 116B, and shifter 116C. The knob 116B provides a means for allow a user to turn the actuator 116. The pin 186 extends from below the housing 116A and is used to engage with the high and low speed cam sidewalls 160 and 176 of the first and second brackets 144 and 146, respectively.

Turning to FIG. 23, the shifter 116C comprises a lower shifter body 116D that receives shifter springs 116E and 116F. The lower shifter body 116D is coupled with an upper shifter body 116G. The lower shifter body 116D and upper shifter body 116G cooperate to form the housing 116A.

During operation, such as shifting the transmission between first, second, and/or third positions, if a gear (such as the first gear 124 and the second gear 126) and an armature pinion (such as the first armature pinion 132 and the second armature pinion 134) are misaligned, the shifter 116C will allow the user to shift the knob 116B into a desired position (low or high), but the gear and armature pinion will not engage until the user actuates the switch 110A to engage the motor 110 so that the gear teeth may align.

In one embodiment, the shifter 116C is spring loaded by the shifter springs 116E and 116F. The shifter springs 116E and 116F apply a load or force on a bracket (either the first or second bracket 144 and 146) until the teeth of the gear and the teeth of the armature pinion are aligned and meshed together.

Referring to FIG. 6A, in operation, the actuator 116 is placed into a neutral position by a user thereby placing the transmission 102 is a neutral position. The movement of the actuator 116 to the neutral position causes the pin 186 of the actuator 116 to be disposed near the curved section 188 of the low speed cam sidewall 160 and not contacting (or barely contacting in some embodiments) the low speed cam sidewall 160. This relative disengagement of the pin 186 with both the low speed cam sidewall 160 and the high speed cam sidewall 176 allows the gear spacer 128 to fully extend, pushing the first gear 124 and the support plate 148 of the first bracket 144 towards the gearbox cover 120, bringing the support plate 148 proximate with the gearbox cover 120.

The gear spacer 128 pushes the second gear 126 and the support plate 164 of the second bracket 146 towards the inner surface 184 of the gearbox housing 118, bringing the support plate 164 into contact (or near to) with the inner surface 184 of the gearbox housing 118. The first and second armature pinions 132 and 134 are disposed between the first and second gears 124 and 126. When the switch 110A is engaged by the user, the motor 110 causes armature shaft 130 to rotate. Because the first and second armature pinions 132 and 134 are disposed between the first and second gears 124 and 126 such that neither of the first and second gears 124 and 126 are aligned with the first and second armature pinions 132 and 134, the first and second armature pinions 132 and 134 rotate freely.

In an example scenario, to shift the transmission 102 into the low speed mode (see FIGS. 12-15), the user moves the actuator 116 to a second position. For example, the user moves the knob 116B of the actuator 116 to the second position. This causes the pin 186 of the actuator 116 to trace the low speed and high speed cam sidewalls 160 and 176 until the pin 186 reaches a middle of the convex edge 162A of the low speed cam sidewall 160. Again, the pin 186 is effectively disengaged with the high speed cam sidewall 176. In some embodiments, the high speed cam sidewall 176 can be sized such that the pin 186 contacts the apex edge 178 of the high speed cam sidewall 176 when the pin 186 reaches the middle of the convex edge 162A of the low speed cam sidewall 160.

The movement of the pin 186 to the middle of the convex edge 162A of the low speed cam sidewall 160 causes the second bracket 146 to translate along the output spindle 106, moving the second gear 126 into mating contact with the second armature pinion 134. The movement of the second bracket 146 towards the first bracket 144 causes the gear spacer 128 to compress. The first bracket 144 and first gear 124 remain proximate the gearbox cover 120. When the switch 110A is engaged by the user, the motor 110 causes the armature shaft 130 to rotate. The rotation of the armature shaft 130 causes the first and second armature pinions 132 and 134 to rotate. Because the second gear 126 is in mating contact with the second armature pinion 134, the output spindle 106 rotates at a second rate of rotation (the low speed mode).

In an example scenario, to shift the transmission 102 into a high speed mode of operation (see FIGS. 16-19), the user moves the actuator 116 to a first position. For example, the user moves the knob 116B of the actuator 116 to a first position. In some embodiments, if the transmission 102 is in a low speed mode, the transmission 102 may be shifted into the neutral position first.

Moving of the knob 116B to the first position causes the pin 186 of the actuator 116 to trace the high speed and low speed cam sidewalls 160 and 176 until the pin 186 reaches a middle of the linear edge 162B of the high speed cam sidewall 160. Again, the pin 186 is effectively disengaged with the low speed cam sidewall 176. In some embodiments, the low speed cam sidewall 176 can be sized such that the pin 186 contacts the concave edge 178B of the low speed cam sidewall 176 when the pin 186 reaches the middle of the linear edge 162B of the high speed cam sidewall 160.

The movement of the pin 186 to the middle of the linear edge 162B of the high speed cam sidewall 160 causes the first bracket 144 to translate along the output spindle 106, moving the first gear 124 into mating contact with the first armature pinion 132. The movement of the first bracket 144 towards the second bracket 146 causes the gear spacer 128 to compress, limited by the gear collar 128A. As mentioned above, the second bracket 146 and second gear 126 remain proximate the inner surface 184 of the gearbox housing 118.

When the switch 110A is engaged by the user, the motor 110 causes the armature shaft 130 to rotate. The rotation of the armature shaft 130 causes the first and second armature pinions 132 and 134 to rotate. Because the first gear 124 is in mating contact with the first armature pinion 132, the output spindle 106 is rotated at a first rate of rotation (high speed mode).

The foregoing embodiments provide various advantages. For example, the dual speed operation of the transmission 102 provides not only two separate operating speeds, but also a unique torque setting for each speed. Another advantage is that the armature shaft 130 rotates at a continuous rate when the switch 110A is activated, causing the first and second armature pinions 132 and 134 to impart the same rotational forces on the first and second gears 124 and 126, respectively. The difference in diameters between the first and second armature pinions 132 and 134 causes the first armature pinion 132 to impart the rotation force to the first gear 124 at a higher speed, but a lower torque. This combination of higher speed and lower torque is contrasted by the second armature pinion 132 that imparts the same rotational force to the second gear 126 at a lower speed, but a higher torque. Again, this is due to the difference in size between the first and second armature pinions 132 and 134.

In some embodiments, the motor 110 comprises an electric motor that is powered by a power source such as a battery 110C. A lower speed mode of operation of the apparatus 100 allows the user to conserve energy of the battery 110C, while the high speed mode of operation of the apparatus 100 allows the user to extract optimal performance of the apparatus 100.

Advantageously, the gearboxes of the present technology allow a power tool such as a chainsaw to be operated at two different rates of speed, namely a first rate of speed (high speed mode) and a second rate of speed (low speed mode). The gearbox allows for efficient and selective shifting of the gearbox between low and high speed modes using an actuator such as a shifter or knob.

When the gearbox is operating in a high speed mode, the torque produced by the gearbox is low. Alternatively, when the gearbox is operating in a low speed mode the torque produced by the gearbox is greater than when the gearbox is in high speed mode. In embodiments where the chainsaw is battery powered, the operation of the gearbox in high speed mode will cause the chainsaw to utilize a specified amount of battery power. Conversely, when the gearbox is placed in the low speed mode, the chainsaw will be able to operate for a longer period of time than if the gearbox is operated in the high speed mode.

Also, operating the gearbox in high speed mode allows for cutting of work pieces that require a high rate of speed of the cutting member of the chainsaw. For example, if the user desires a clean edge cut on the work piece the high speed mode is selected. The high speed mode causes the cutting member of the chainsaw to move faster and cut the work piece more cleanly (e.g., leaving less edge splintering and debris on the work piece). Operation of the gearbox in low speed mode allows for cutting of work pieces that require a low rate of speed of the cutting member of the chainsaw. For example, low speed mode can be used when the user is less concerned with obtaining a clean cut of the work piece. For example, if the user is cutting tree debris or trimming dead tree branches, the user will not be as concerned with splintering of the wood.

In another advantage, the gearbox includes two oil pumps that are each capable of operating at different flow rates. The oil pumps are operated by rotation of the output spindle such that variations in the rotation rate of the output spindle causes a proportional change in flow rate of oil that is output by the oil pumps. For example, when the gearbox is operated in high speed mode one of the oil pumps outputs oil at a high flow rate to lubricate the output spindle. Also, the second oil pump outputs oil at a high flow rate to lubricate the cutting member.

When the gearbox is operated in low speed mode one of the oil pumps outputs oil at a low flow rate to lubricate the output spindle. Also, the second oil pump outputs oil at a low flow rate to lubricate the cutting member.

While FIGS. 1-23 are described independently from one another, FIGS. 1-23 can also be referred to collectively for purposes of context and clarity of explanation. That is, a description of a particular figure may reference portions of other figures, either explicit call outs to other figures or by the use of reference signals that are present in other figures. In some instances groups of figures may be referred to collectively.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally and interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," etc., are used interchangeably herein to generally refer to the condition of being mechanically connected/in physical communication, either directly or indirectly. It is further noted that various figures (including component diagrams) shown and discussed herein are for illustrative purpose only, and are not drawn to scale.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A chainsaw, comprising:
   a housing having a motor with an armature shaft, the armature shaft connected to a multi-gear transmission, an output spindle of the transmission being operatively connected to a cutting member;
   the transmission having:
   a first gear and a second gear, the first gear and the second gear held in spaced apart relationship by a gear spacer that is disposed therebetween, the first gear and the second gear being coupled to the output spindle, a first bracket and a second bracket, the first gear and the second gear being disposed between the first and second brackets, the first and second brackets being capable of moving along the output spindle;
   the armature shaft having a first armature pinion and a second armature pinion; and
   an actuator coupled with the first and second brackets, the actuator having a first position and a second position, when the actuator is in the first position, the first and second brackets are moved along the output spindle such that the first armature pinion engages with the first gear, when the actuator is in the second position, the first and second brackets are moved along the output spindle such that the second armature pinion engages with the second gear.

2. The chainsaw of claim 1, further comprising a pair of guide rails coupled to the first and second brackets, the first and second brackets being capable of moving along the pair of guide rails.

3. The chainsaw of claim 1, wherein the actuator has a third position, when the actuator is in the third position, the first and second brackets are moved along the output spindle such that neither the first armature pinion nor the second armature pinion engages with either the first gear or the second gear, placing the chainsaw in a neutral position.

4. The chainsaw of claim 3, wherein the first bracket comprises a first bracket top plate that comprises a high speed cam aperture and the second bracket comprises a second bracket top plate that comprises a low speed cam aperture.

5. The chainsaw of claim 4, wherein the actuator has a pin positioned in the high speed cam aperture and the low speed cam aperture, and the first bracket and the second bracket move relative to each other by movement of the actuator pin, further wherein placing the actuator in the first position causes the second bracket to locate to a second bracket stop while the first bracket is moved towards the second bracket.

6. The chainsaw of claim 5, wherein placing the actuator in the second position causes the first bracket to locate at a first bracket stop while the second bracket is moved towards the first bracket, and further wherein placing the actuator in the third position causes the first bracket to locate to the first bracket stop and the second bracket to locate to the second bracket stop.

7. The chainsaw of claim 6, wherein the high speed cam aperture has a semi-circular cam sidewall with an apex edge and one linear edge and the low speed cam aperture has a moon-shaped cam sidewall with a concave edge and a convex edge.

8. The chainsaw of claim 6, wherein when the actuator is in the first position the actuator moves the first and second brackets such that the actuator contacts a first edge of the high speed cam aperture without contacting a first edge of the low speed cam aperture, wherein when the actuator is in the second position the actuator moves the first and second brackets such that the actuator contacts a second edge of the low speed cam aperture without contacting a second edge of the high speed cam aperture, and wherein when the actuator is in the third position the actuator moves the first and second brackets such that the actuator contacts neither the high speed cam aperture nor the low speed cam aperture.

9. The chainsaw of claim 1, wherein when the actuator is in the first position, the output spindle is operated at a first rate of rotation by the first armature pinion and the first gear.

10. The chainsaw of claim 1, wherein when the actuator is in the second position, the output spindle is operated at a second rate of rotation by the second armature pinion and the second gear.

11. The chainsaw of claim 10, wherein the second rate of rotation that is less than the first rate of rotation.

12. A chain saw having a multi-speed transmission comprising:
   a motor having an armature shaft;
   a transmission having an output spindle, the transmission having a gearbox connecting the armature shaft to the output spindle;
   the output spindle driving a cutting element;
   the gearbox includes a first gear and a second gear, and a first pinion and a second pinion, wherein the first gear and the first pinion are engaged in a high speed position, and the second gear and the second pinion are engaged in a low speed position; and
   a first bracket and a second bracket, the first bracket adapted to move the first gear into engagement with the first pinion, and the second bracket is adapted to move the second gear into engagement with the second pinion, wherein the first and second gears are rotatingly fixed to the output spindle but free to move along a longitudinal axis of the output spindle; wherein the first pinion and the second pinion are fixedly secured to the armature shaft; and an actuator is adapted to move the first bracket and the second bracket so that in the high speed position the first gear engages the first pinion, and in the low speed position the second gear engages the second pinion.

13. The chain saw of claim 12, further comprising:
a gear spacer located inbetween the first and second gears to bias the gears apart; and
wherein the first bracket has a first plate with an aperture and the second bracket has a second plate with an aperture, and at least a portion of the two apertures overlap;
the actuator includes a pin which extends through the apertures of both brackets, and operation of the actuator moves the pin against a sidewall of at least one of the apertures to move one of the first or second brackets.

14. The chain saw of claim 13, wherein the actuator includes a third neutral position, where neither the first gear or the second gear is engaged with either the first or the second pinion.

15. The chain saw of claim 14, further comprising an oil pump connected to the output spindle so that more oil is pumped when the chain saw is in the high speed position, and less oil is pumped when in the low speed position.

16. An assembly, comprising:
two gears that are coupled to an output spindle, each of the two gears being capable of rotating the output spindle; two brackets for translating the two gears along the output spindle;
a first armature pinion and a second armature pinion, both the first armature pinion and the first armature pinion are coupled to an armature shaft; and
an actuator capable of being located in a first position and a second position, when the actuator is in the first position the actuator moves one of the two brackets causing the first armature pinion to engage with one of the two gears and the second pinion rotates freely and when the actuator is in the second position the actuator moves the other of the two brackets causing the second armature pinion to engage with the other of the two gears and the first pinion rotates freely.

17. The assembly of claim 16, further comprising:
a sprocket coupled with the output spindle, the sprocket transferring rotational movement of the output spindle to a cutting member coupled to the sprocket; and
a gear collar disposed between the two gears, the gear collar defining a space between the two gears when the actuator is in either the first position or the second position so as to align the first and second armature pinions with at least one of the two gears.

18. The assembly of claim 17, further comprising an oil pump coupled to the output spindle, the oil pump delivering oil to the output spindle and the cutting member associated with the output spindle.

* * * * *